(12) United States Patent
Wang et al.

(10) Patent No.: US 12,003,728 B2
(45) Date of Patent: Jun. 4, 2024

(54) METHODS AND SYSTEMS FOR TEMPORAL RESAMPLING FOR MULTI-TASK MACHINE VISION

(71) Applicant: Alibaba Innovation Private Limited, Singapore (SG)

(72) Inventors: Shurun Wang, Beijing (CN); Zhao Wang, Beijing (CN); Yan Ye, San Diego, CA (US); Shiqi Wang, Kowloon Tong (HK)

(73) Assignee: Alibaba Innovation Private Limited, Singapore (SG)

( * ) Notice: Subject to any disclaimer, the term of this patent is extended or adjusted under 35 U.S.C. 154(b) by 0 days.

(21) Appl. No.: 17/816,825

(22) Filed: Aug. 2, 2022

(65) Prior Publication Data

US 2024/0048709 A1    Feb. 8, 2024

(51) Int. Cl.
*H04N 19/132* (2014.01)
*H04N 19/137* (2014.01)
*H04N 19/172* (2014.01)

(52) U.S. Cl.
CPC ......... *H04N 19/132* (2014.11); *H04N 19/137* (2014.11); *H04N 19/172* (2014.11)

(58) Field of Classification Search
CPC ... H04N 19/132; H04N 19/137; H04N 19/172
See application file for complete search history.

(56) References Cited

U.S. PATENT DOCUMENTS

| 10,701,394 | B1* | 6/2020 | Caballero | G06N 3/045 |
| 2013/0301946 | A1* | 11/2013 | Rossato | G06T 9/40 382/236 |
| 2020/0389665 | A1* | 12/2020 | Gao | H04N 19/115 |

OTHER PUBLICATIONS

Adini et al., "Context-enabled learning in the human visual system," Nature, vol. 415, 2002, pp. 790-793.
Afonso et al., "Video Compression Based on Spatio-Temporal Resolution Adaptation," IEEE Transactions on Circuits and Systems for Video Technology, vol. 29, No. 1, 2019 pp. 275-280.
An et al., "Block partitioning structure for next generation video coding," International Telecommunications Union, 2015, 8 pages.
Balle, et al., "Variational Image Compression with a Scale Hyperprior," International Conference on Learning Representations, 2018, 23 pages.
Balle et al., End-to-End Optimized Image Compression, ICLR, 2017, 27 pages.
Bosch et al., "Segmentation-Based Video Compression Using Texture and Motion Models," IEEE Journal of Selected Topics in Signal Processing, vol. 5, No. 7, 2011, pp. 1366-1377.
Bross et al., Developments in International Video Coding Standardization After AVC, With an Overview of Versatile Video Coding (VVC), Proceedings of the IEEE, vol. 109, No. 9, Sep. 2021, pp. 1463-1493.

(Continued)

*Primary Examiner* — Hesham K Abouzahra
(74) *Attorney, Agent, or Firm* — Finnegan, Henderson, Farabow, Garrett & Dunner, LLP

(57) ABSTRACT

A method for temporal resampling for multi-task machine vision is provided. The method includes receiving a bitstream of a video sequence after temporal resampling; and constructing a target frame from the bitstream using a frame construction model.

17 Claims, 14 Drawing Sheets

(56) References Cited

OTHER PUBLICATIONS

Chao, et al., "A Novel Rate Control Framework for SIFT/SURF Feature Preservation in H.264/AVC Video Compression," IEEE Transactions on Circuits and Systems for Video Technology, vol. 25, No. 6, Jun. 2015, pp. 958-972.

Duan et al., "Overview of the MPEG-CDVS Standard," IEEE Transactions on Image Processing, vol. 25, No. 1, Jan. 2016, pp. 179-194.

Duan et al., Compact Descriptors for Video Analysis: The Emerging MPEG Standard, IEEE Computer Society, 2018, pp. 44-54.

Duan et al., "Video Coding for Machines: A Paradigm of Collaborative Compression and Intelligent Analytics," IEEE Transactions on Image Processing, vol. 29, 2020, pp. 8680-8695.

Li et al., "$\lambda$ Domain Rate Control Algorithm for High Efficiency Video Coding," IEEE Transactions on Image Processing, vol. 23, No. 9, Sep. 2014, pp. 3841-3854.

Liu et al., "Compressive Sampling-Based Image Coding for Resource-Deficient Visual Communication," IEEE Transactions on Image Processing, vol. 25, No. 6, Jun. 2016, pp. 2844-2855.

Liu et al., "CNN-Basesd DCT-Like Transform for Image Compression," Springer, 2018, pp. 61-72.

Minnen et al., "Joint Autoregressive and Hierarchical Priors for Learned Image Compression," $32^{nd}$ Conference on Neural Information Processing System, 2018, 10 pages.

Mohan et al., "Internet of Video Things in 2030: A World with Many Cameras," IEEE Xplore, 2017, 4 pages.

Pfaff et al., "CE3: Affine linear weighted intra prediction (CE3-4.1, CE3-4.2)," JVET-N0217, $14^{th}$ Meeting: Geneva, CH, Mar. 19-27, 2019, 17 pages.

Rabbani et al., "JPEG2000: Image compression fundamentals, standards and practice," Journal of Electronic Imaging, 2002, 11(2): 286.

Sullivan et al., "Overview of the High Efficiency Video Coding (HEVC) Standard," IEE Transactions on Circuits and Systems for Video Technology, vol. 22, No. 12, pp. 1649-1668 (2012).

Toderici et al., "Variable Rate Image Compression with Recurrent Neural Networks," ICLR, 2016, 12 pages.

Wallace et al., "The JPEG Still Picture Compression Standard," IEEE Transactions on Consumer Electronics, vol. 38, No. 1, Feb. 1992, 17 pages.

Wang et al., "Extended Coding Unit Partitioning for Future Video Coding," IEEE Transactions on Image Processing, vol. 29, 2020, pp. 2931-2946.

Wang et al., "End-to-End Compression Towards Machine Vision :Network Architecture Design and Optimization," IEEE Open Journal of Circuits and Systems, vol. 2, 2021, pp. 675-685.

Wiegand et al., "Overview of the H.264/AVC Video Coding Standard," IEEE Transactions on Circuitds and Systems for Video Technology, vol. 13, No. 7, Jul. 2003, pp. 560-576.

Zhou et al., "NSST: Non-Separable Secondary Transforms for Next Generation Video Coding," IEEE, 2016, 5 pages.

\* cited by examiner

METHODS AND SYSTEMS FOR TEMPORAL RESAMPLING FOR MULTI-TASK MACHINE VISION

TECHNICAL FIELD

The present disclosure generally relates to video processing, and more particularly, to temporal resampling for multi-task machine vision.

BACKGROUND

Multimedia acquisition, processing, transmission and application systems have been developed in recent years, leading to an explosive growth of visual data. Meanwhile, a compact representation of video plays a crucial role in visual data centered applications, as video accounts for the largest proportion in global data traffic. In the past decade, the improvement for better human perception with less representation expense and numerous algorithms have been proposed to promote a rate-distortion performance. Moreover, with the unprecedented success of artificial intelligence in various applications, information preservation of analysis feature has been playing a fundamental role in visual data compression, which is extracted from video for analysis and understanding. Consequently, an ultimate consumer of the compressed visual data is automatic analysis systems, rather than human vision.

Analogously, abundant compact representation algorithms for analysis features, which are extracted with specific models, have been proposed to preserve the feature-level information and exclude the analysis unrelated texture-level information for better representation compactness. However, the compact representation algorithms of specific analysis feature are difficult to accommodate with multi-task systems and existing video codecs.

SUMMARY OF THE DISCLOSURE

Embodiments of the present disclosure provide a method for temporal resampling for multi-task machine vision. The method includes receiving a bitstream of a video sequence after temporal resampling; and constructing a target frame from the bitstream using a frame construction model.

Embodiments of the present disclosure provide an apparatus for temporal resampling for multi-task machine vision. The apparatus includes a memory figured to store instructions; and one or more processors configured to execute the instructions to cause the apparatus to perform: receiving a bitstream of a video sequence after temporal resampling; and constructing a target frame from the bitstream using a frame construction model.

Embodiments of the present disclosure provide a method for temporal resampling for multi-task machine vision. The method includes receiving a video sequence; determining a moving complexity of the video sequence; and determining whether to perform temporal resampling based on the moving complexity.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

For texture compression, a series of standards have been developed to compress visual data, such as JPEG (Joint Photographic Experts Group) and JPEG 2000 for still image compression, and H.264/AVC (Advanced Video Coding), H.265/HEVC (High Efficiency Video Coding) and VVC (Versatile Video Coding) for video data compression. In order to improve the compression performance furthermore, there are numerous algorithms developed for the future video compression standards, including matrix weighted intra prediction, quadtree plus binary, extended coding unit partitioning and mode-dependent non-separable secondary transform. Meanwhile, various optimization algorithms have been proposed in terms of rate-distortion optimization for both texture and feature quality with encoder optimization. Moreover, with unprecedented development of visual data understanding, there are tremendous challenges to manage thousands of visual data bitstreams compactly and transmit them simultaneously for further analysis, such as smart cities and Internet of Video Things (IoVT). Furthermore, the analysis performance is influenced dramatically due to the quality degradation of the feature in the human vision quality-oriented compression.

In the present disclosure, a method for temporal resampling with deep learning-based video compression for multi-task machine vision and an temporal resampling framework are provided to improve the visual data compression efficiency.

The standards for compact visual feature representation have also been developed by Moving Picture Experts Group (MPEG) to dramatically reduce the representation data size of analysis feature, which could facilitate various intelligent tasks with front-end intelligence. Specifically, the standards of Compact Descriptors for Visual Search (CDVS) and Compact Descriptors for Video Analysis (CDVA) have been finalized, targeting at achieving very compact descriptors for visual data. Moreover, the standardization of video coding for machines has also been launched, in an effort to determine a complete picture of the compact representation of visual data in terms of machine vision.

Figure 1:
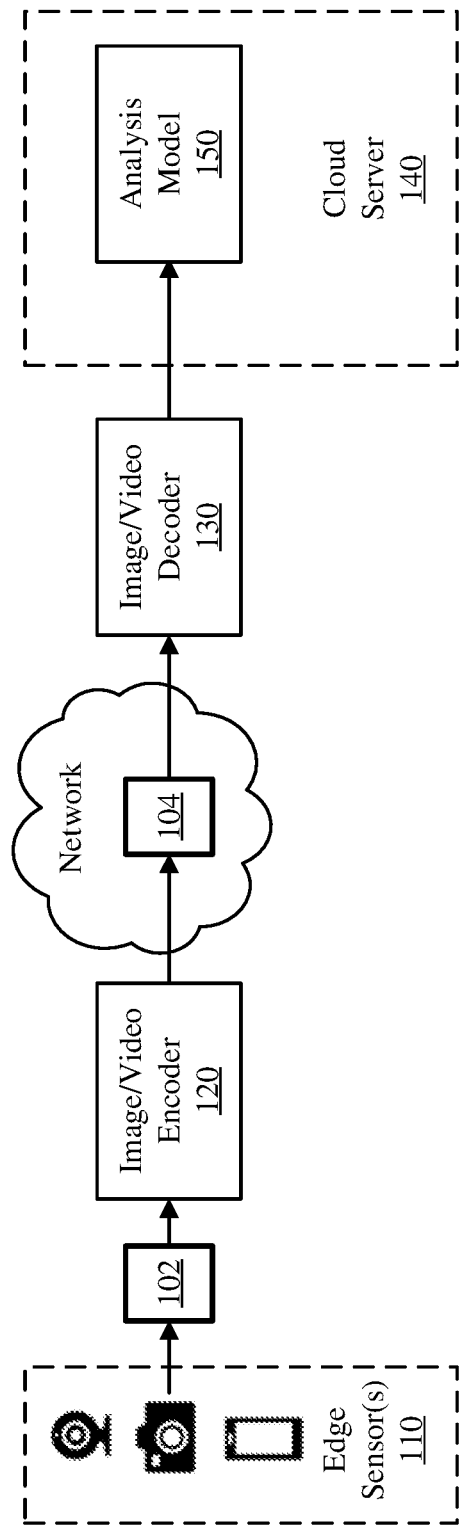
FIG. 1 is a diagram illustrating a system for collecting visual data and performing computer vision task, according to some embodiments of the present disclosure.

FIG. 1 is a diagram illustrating a system 100 for collecting visual data and performing computer vision task, according to some embodiments of the present disclosure. As shown in FIG. 1, the system 100 includes one or more edge sensors 110, an encoder 120 for performing image/video encoding, a decoder 130 for performing image/video decoding, and a cloud server 140 for performing computer vision tasks using analysis model(s) 150. Particularly, in some deep learning applications, such as the autopilot, computer vision tasks, including object detection and image classification, have taken a significant portion of visual data consumers. The compression of visual data constitutes the basic infrastructure to support these applications from the perspective of Compress-then-Analyse (CTA), which can be referred to as a framework for machine vision application.

For example, the edge sensor(s) 110 may include devices having a photographing or video recording function, such as cameras, smartphones, video cameras, monitors, and digital cameras, to collect the visual data 102, but the present disclosure is not limited thereto. As shown in FIG. 1, the visual data 102 collected with the edge sensor(s) 110 can be encoded, by the encoder 120, into a bitstream 104 and transmitted via the network. The encoded bitstream 104 is decoded by the decoder 130 and transferred to the cloud server 140. Then, the reconstructed visual data is further fed into the analysis model 150 for computer vision tasks.

In the system 100, image/video compression can be applied to the visual data 102 to obtain a compact image. The development of image/video compression algorithms is coding standard driven. For texture compression, a series of standards have been developed to compress visual data, such as JPEG and JPEG 2000 for still image compression, and H.264/AVC, H.265/HEVC and VVC (Versatile Video Coding) for video data compression. In order to improve the compression performance furthermore, numerous algorithms, including matrix weighted intra prediction, quadtree plus binary, extended coding unit partitioning and mode-dependent non-separable secondary transform, are developed for the future video compression standards. In addition, various optimization algorithms have been proposed in terms of rate-distortion optimization for both texture and feature quality with the encoder optimization. Moreover, with the unprecedented development of visual data understanding, managing thousands of visual data bitstreams compactly and transmitting the data simultaneously for further analysis become challenges in various applications and fields, such as smart cities and Internet of Video Things (IoVT).

In the cloud server 140, the analysis performance may be influenced due to the degradation of feature quality in a texture quality-oriented compression. To address this problem, Moving Picture Experts Group (MPEG) has been developing standards for compact visual feature representation to reduce the representation data size of analysis feature and facilitate various intelligent analysis tasks with front-end intelligence. For example, Compact Descriptors for Visual Search (CDVS) and Compact Descriptors for Video Analysis (CDVA) standards aim to achieve compact descriptors for visual data. The standardization of video coding for machine is also launched to figure a complete picture of the compact representation of visual data in terms of the machine vision.

In visual data representation and understanding, deep learning has revealed strong representation capability in various applications, especially in visual data representation and understanding domain. In some embodiments, deep neural network based end-to-end compression frameworks can be applied. For example, a recurrent neural network (RNN) can be applied to the end-to-end learned image representation to achieve a comparable performance compared with JPEG. A convolutional neural network (CNN) based end-to-end image compression model is proposed motivated by the block-based transform in traditional image/video compression, and combined with the discreate cosine transform (DCT) to achieve a comparable performance compared with JPEG at low bitrate. In some embodiments, nonlinear transformation is one of the properties of neural networks that is consistent with the human visual system (HVS). In some embodiments, a generalized divisive normalization (GDN) is proposed to optimize the end-to-end nonlinear transform codec for perceptual quality. On this basis, a density estimation model is proposed, which is combined with a cascade of GDNs, and surpasses the compression performance of JPEG 2000.

In some embodiments, the redundancy of the latent code in end-to-end image compression is further eliminated under an entropy penalization constraint with weight reparameterization, which is implemented with a variational hyper-prior model. In order to further exploit the correlation of the latent representation, an autoregressive model is proposed and achieves a superior rate-distortion performance when compared with the current state-of-the-art image codec, BPG (Better Portable Graphics), in terms of both PSNR (Peak Signal-to-Noise Ratio) and MS-SSIM (Multi-Scale-Structural Similarity Index) distortion metrics. In some embodiments, a discretized Gaussian Mixture Likelihoods is proposed to parameterize the distributions of the latent representations to further improve the accuracy of the entropy models for the rate estimation. Accordingly, a more accurate and flexible entropy model can be formulated to achieve a comparable performance with the latest compression standard VVC regarding bitrate-PSNR performance.

Some algorithms have been proposed to exploit the temporal redundancy of video compression for better representation efficiency towards human vision. In some embodiments, a segmentation-based video compression framework is proposed by sending a parameter of skipped parts as side information to improve the compression performance. Moreover, motivated by the powerful information representation ability of deep learning, CNN-based models have been combined with temporal resampling and applied to video compression for better signal coding performance. The proposed algorithms focus on the information preservation at signal level and target for better human perception quality. In some situations, the human perception quality is not consistent with machine vision performance. Moreover, the temporal resampling for video coding towards multiple tasks is also not fully investigated.

There are numerous developments in the field of visual data compression in recent decades. With the progresses of various machine analysis tasks, some analysis feature compression algorithms are also proposed to improve the visual data compression efficiency towards machine vision and accommodate with the rapid development of machine analysis applications. However, the codecs for analysis features are mainly for specific analysis information preservation, which is difficult to accommodate with the existing video codecs and multi-task machine vision systems. Meanwhile, the existing video codecs mainly focus on the signal fidelity and human vision quality, not machine vision. In order to improve the representation efficiency of video codecs, the temporal resampling has been investigated but the proposed temporal resampling methods also focus on the signal fidelity and human perception quality, which limits the performance of temporal resampling for video compression towards machine vision. Moreover, the adaptive temporal resampling towards machine vision is not investigated, considering the moving complexity of video and the compression ratio constraint.

Figure 2:
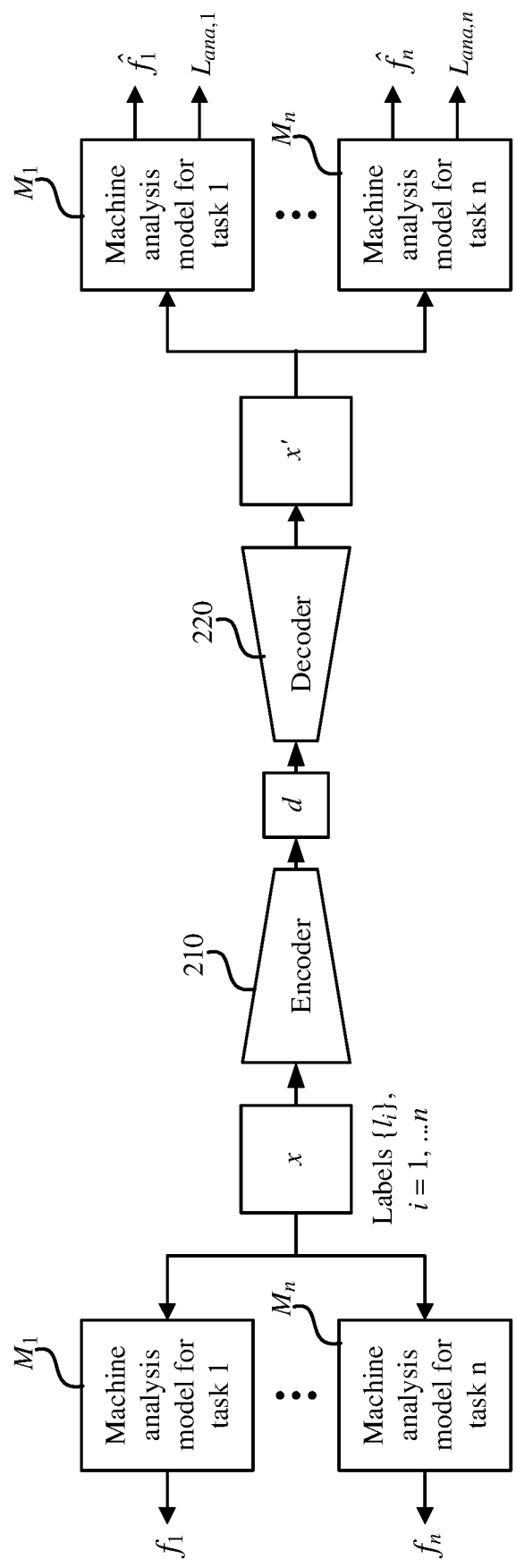
FIG. 2 is a diagram illustrating a framework for an exemplary image processing for multi-task machine vision, according to some embodiments of the present disclosure.

FIG. 2 is a diagram illustrating a framework 200 for an exemplary image processing for multi-task machine vision, according to some embodiments of the present disclosure. As shown in FIG. 2, the framework 200 includes an encoder 210 and a decoder 220 configured to provide video processing. For example, encoder 210 is configured to encode a video or an image (including compressing) for transmitting, decoder 220 is configured to restore the video or image information for performing machine analysis. Specifically, an input image x is fed into the encoder 210 and is encoded into a bitstream b. The decoder 220 is configured to decode from the bitstream b to extract general visual information including the machine analysis information, and output a reconstructed image x'. In some embodiments, the encoder 210 can included a down-sampling module, and the decoder 220 can include an up-sampling module. The down-sampling module and up-sampling module are used to provide compact images for performing machine analysis.

Referring to FIG. 2, multiple machine analysis models may be configured to perform analysis for multiple tasks to an image of interest. For example, the framework 200 may include n pre-trained machine analysis models $M_1$-$M_n$ a associated with n different tasks. Accordingly, the i-th machine analysis model $M_i$ is configured to obtain an extracted feature map $f_i$ from the input image x, and obtain an extracted feature map $\hat{f}_i$ from the reconstructed image x', respectively. In addition, in some embodiments, for each machine analysis model $M_i$, a corresponding machine analysis loss function $L_{ana,i}$ can be determined according to the definition of the machine analysis model $M_i$.

However, a temporal resampling may perform on a video sequence, the images removed after the temporal resampling cannot be used for machine analysis, which may affect the performance of temporal resampling towards machine vision.

The present disclosure provides a method for temporal resampling of video compression for multi-task machine vision.

Figure 3:
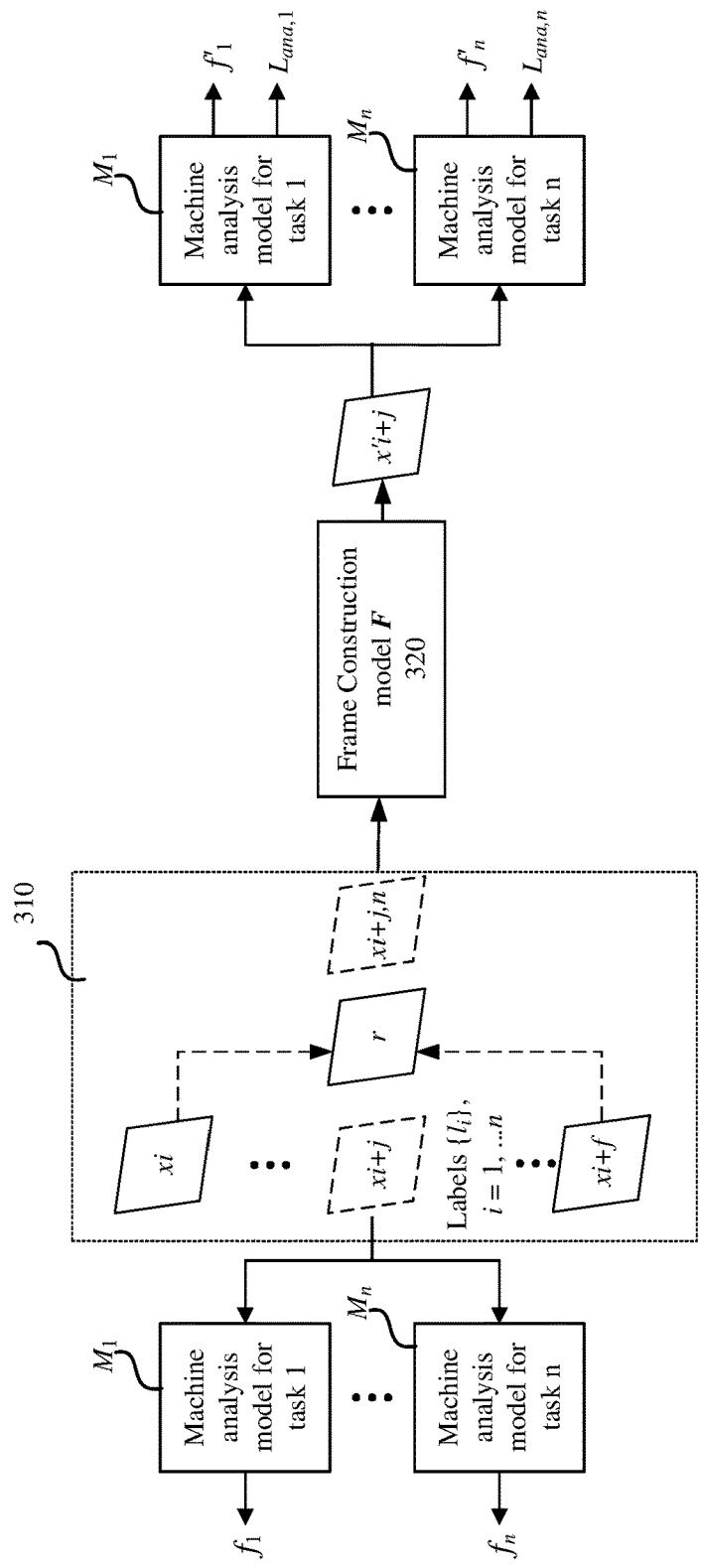
FIG. 3 is a diagram illustrating a framework for training a frame construction model for temporal resampling, according to some embodiments of the present disclosure.
Figure 4:
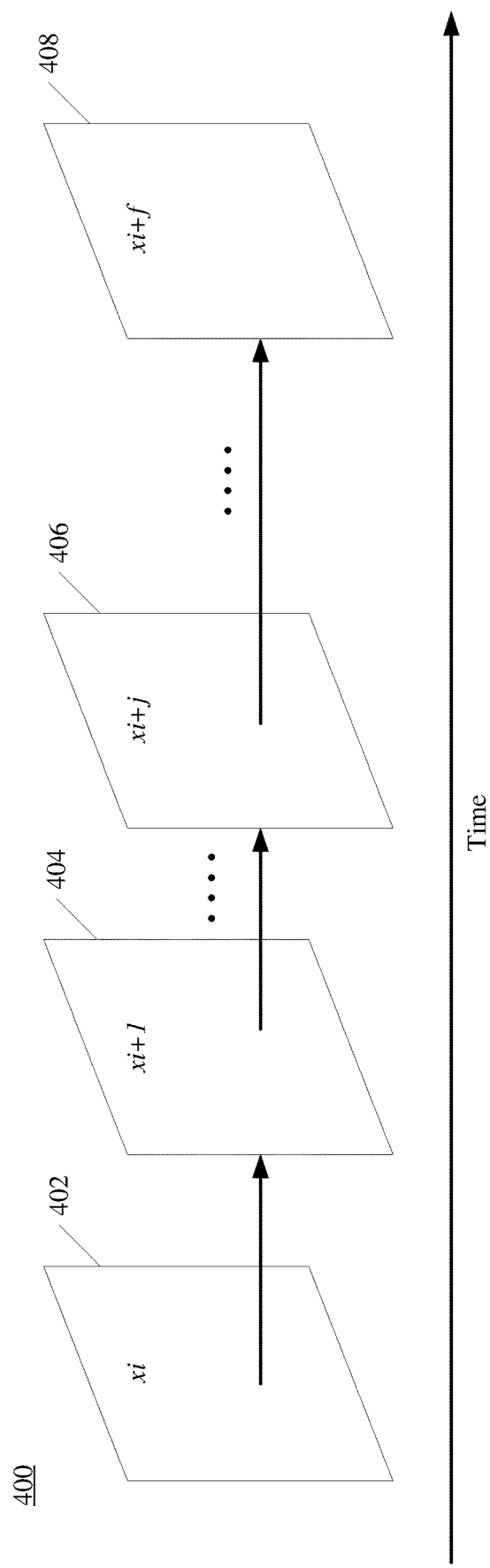
FIG. 4 illustrates structures of an example video sequence, according to some embodiments of the present disclosure.

FIG. 3 is a diagram illustrating a framework 300 for training a frame construction model for temporal resampling, according to some embodiments of the present disclosure. Referring to FIG. 3, with a temporal resampling module 310, an original video sequence is resampled with a resampling factor f, which means the first frame of every f frames (e.g., $x_i$ and $x_{i+f}$) is preserved for compression and other frames (e.g., $x_{i+j}$, 0<j<f) are removed. FIG. 4 illustrates structures of an example video sequence 400, according to some embodiments of the present disclosure. Video sequence 400 can be a live video or a video having been captured and archived. Video 400 can be a real-life video, a computer-generated video (e.g., computer game video), or a combination thereof (e.g., a real-life video with augmented-reality effects). Video sequence 400 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 4, video sequence 400 can include a series of frames (e.g., pictures, images) arranged temporally along a timeline, including frames 402, 404, 406, and 408. Frames 402 and 404 are continuous, and there are more frames between frames 404 and 406, and frames 406 and 408. Frames 402, 404, 406, and 408 can be also referred to as pictures or images. In this example, video sequence 400 includes f+1 frames from frame $x_i$ 402 to frame $x_{i+f}$ 408. A temporal resampling can be performed on video sequence 400. If a video sequence is resampled with a resampling factor f, which means the first frame of every f frames is preserved for compression and other frames are removed. In this example, frame $x_i$ 402 and frame $x_{i+f}$ 408 are preserved, while frame $x_{i+1}$ 404 to frame $x_{i+f-1}$, including frame $x_{i+j}$ 406 are removed.

Referring back to FIG. 3, an averaged residual r of the target frame $x_{i+j}$ (e.g., the (i+j)$^{th}$ frame) is achieved from a residual between the preserved frames $x_i$ and $x_{i+f}$. The averaged residual r indicates a temporal movement tendency, which can be denoted as $$r = \frac{(x_{i+f} - x_i)}{f}.$$

A naïve prediction of target frame $x_{i+j}$ (e.g., the (i+j)$^{th}$ frame), which is denoted as $x_{i+j,n}$, from the i$^{th}$ frame $x_i$ is a sum of the preserved frames $x_i$ and the averaged residual r, denoted as $x_{i+j,n}=x_i+jr$. An input of frame construction model F 320 is a channel-wise concatenation of the average residual r and the naïve prediction $x_{i+j,n}$, which is achieved by a channel-wise stack. To be specific, in some embodiments, the shapes of $x_{i+j,n}$ and r are both h×w×3, where h is a heigh of the shape, w is a width of the shape, and 3 represents a number of channels, then an output shape of channel-wise concatenate is h×w×6. The constructed frame $x'_{i+j}$ of the target frame $x_{i+j}$, which is removed after temporal resampling, can be obtained as an output of the frame construction model F 320.

In order to preserve the machine analysis features for multiple tasks, the feature maps from various machine analysis models (e.g., $M_1, \ldots, M_n$), are extracted from both target frame $x_{i+j}$ and the constructed frame $x'_{i+j}$. The feature maps for the target frames and the constructed frames from the plurality of machine analysis models can be denoted as $\{f_1, \ldots, f_n\}$ and $\{f'_1, \ldots, f'_n\}$ respectively.

In some embodiments, a loss functions $\{L_{ana,i}\}$ of various machine analysis models (e.g., $M_1, \ldots, M_n$) are also achieved with label information $\{l_i\}$. The label information can be obtained by a data labeling process and the metadata information from the datasets towards machine vision (e.g. COCO (Common Objects in Context), Open Images, TVD (Tencent Video Dataset), etc.), in which raw data (e.g., images, text files, videos, etc.) are identified and one or more meaningful and informative labels are added to provide context. The various machine analysis models can learn the raw data from the label information.

After temporal resampling, a plurality of frames are removed for reducing the data volume. With the frame construction model, such removed frames can be constructed for the machine analysis models for multiple tasks, which can improve the training efficiency and accuracy.

Figure 5:
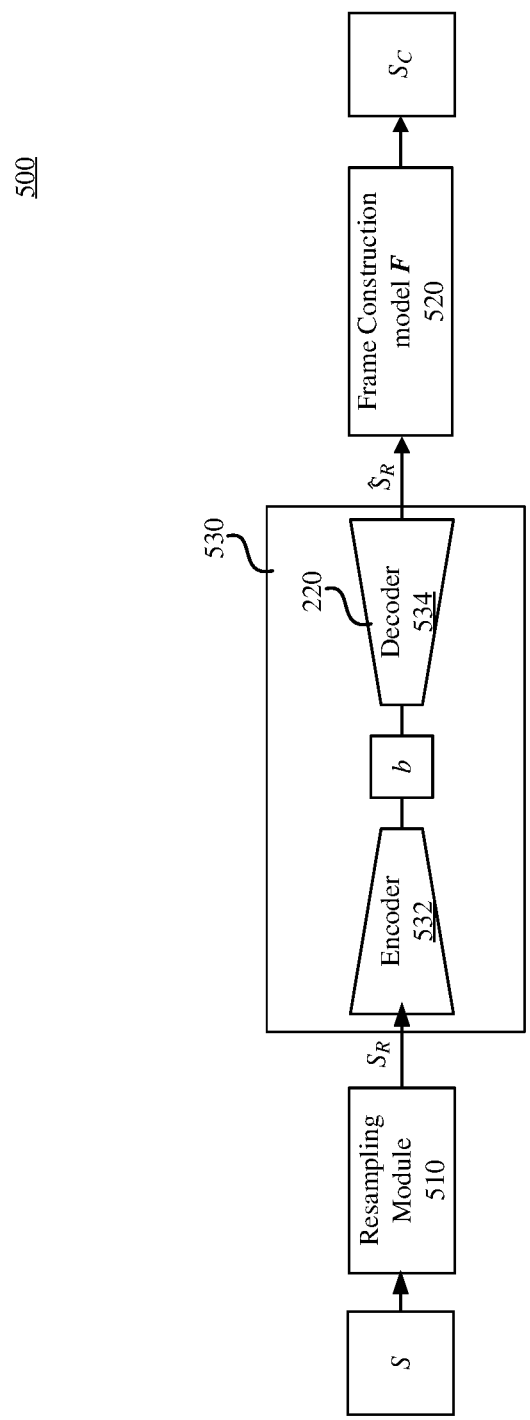
FIG. 5 is a diagram illustrating a framework for temporal resampling of video compression for multi-task machine vision, according to some embodiments of the present disclosure.

FIG. 5 is a diagram illustrating a framework 500 for temporal resampling of video compression for multi-task machine vision, according to some embodiments of the present disclosure. Referring to FIG. 5, a codec 530 is introduced for temporal resampling. In some embodiments, the codec 530 used in the testing stage may not be considered in the training stage.

In a testing stage, as shown in FIG. 5, an original video sequence S is resampled by resampling module 510 with a resampling factor f and a temporal resampled sequence $S_R$ (e.g., including frames $x_i$ and $x_{i+j}$) is obtained. The temporal resampled sequence $S_R$ is encoded and decoded with video codecs (e.g., encoder 532 and decoder 542). An encoder side 532 of the visual data codec 530 performs an encoding process. In the encoding process, for example, an encoder is used to compress a resampled sequence $S_R$ to generate a quantized and compressed bitstream b. The bitstream b is transmitted to a decoder side 534 of the visual data codec 530 for a decoding process. In the decoding process, a decoder is used to decode the bitstream b to extract general visual information (e.g., resampling factor f) from the bitstream b and generate a reconstructed sequence (e.g., a reconstructed compact sequence $\hat{S}_R$, including reconstructed frames $x'_i$ and $x'_{i+j}$). The removed frames (e.g., $x_{i+j}$) are constructed from the reconstructed frames (e.g., $x'_i$) of the remaining frames (e.g., $x_i$) at the frame construction model F 520. Finally, a fully constructed sequence $S_C$ (e.g., including decoded frame $x'_i$ and constructed frame $x'_{i+j}$) can be obtained and fed for multi-task machine vision analysis.

Figure 6A:
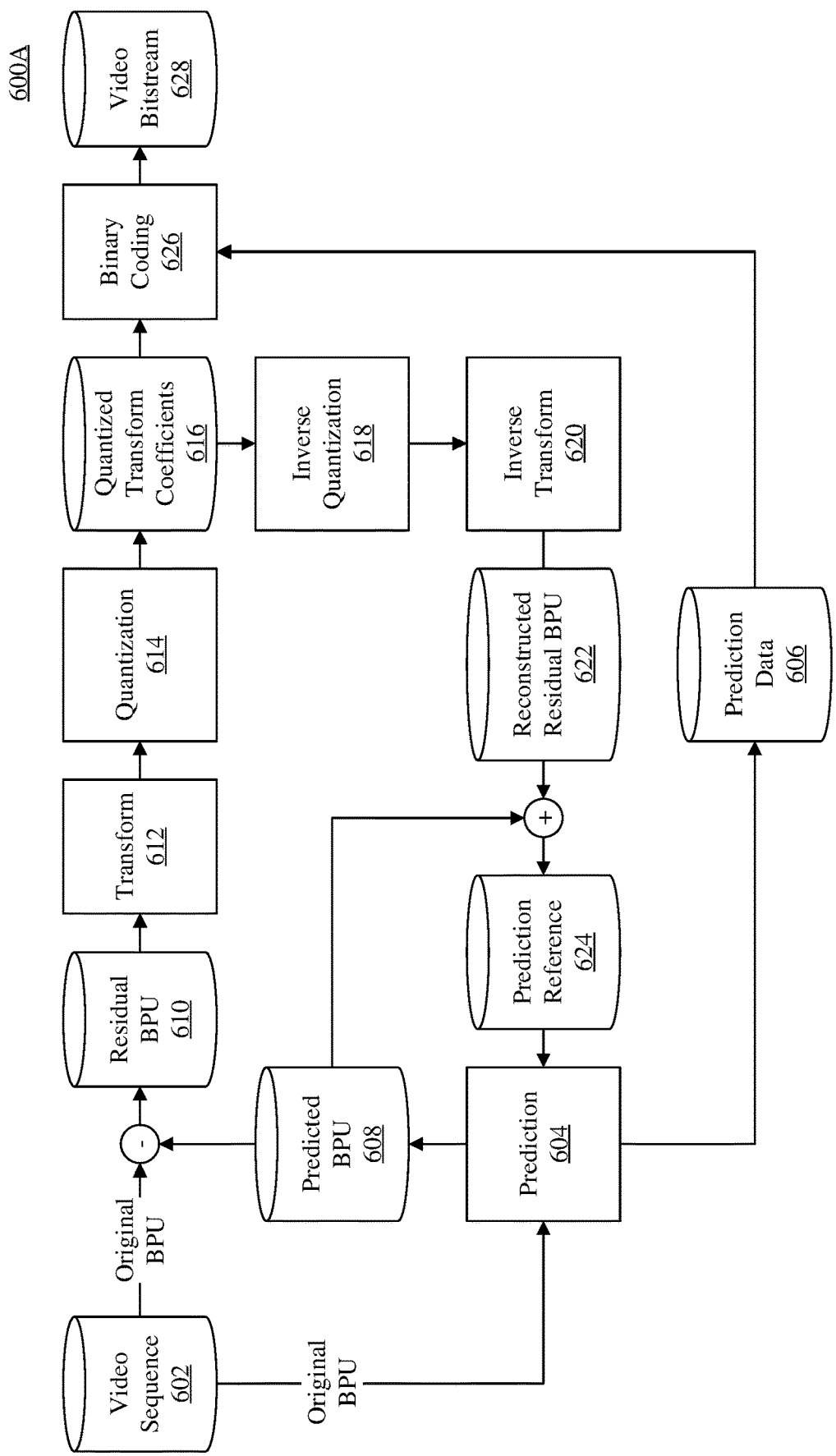
FIG. 6A is a diagram illustrating an example video encoding process, according to some embodiments of the present disclosure.

Image or video coding performed by the visual data codec 530 in FIG. 5 may include multiple stages of operations, examples of which are shown in FIGS. 6A-6B and FIGS. 7A-7B. FIG. 6A shows a schematic of an example video encoding process, according to some embodiments of the present disclosure. For example, encoding process 600A shown in FIG. 6A can be performed by an encoder (e.g., encoder side 532 in FIG. 5). As shown in FIG. 6A, the encoder can encode video sequence 602 into video bitstream 628 according to encoding process 600A. Video sequence 602 can include a set of pictures (referred to as "original pictures") arranged in a temporal order. Each original picture of video sequence 602 can be divided by the encoder into basic processing units, basic processing sub-units, or regions for processing. In some embodiments, the encoder can perform process 600A at the level of basic processing units for each original picture of video sequence 602. For example, the encoder can perform process 600A in an iterative manner, in which the encoder can encode a basic processing unit in one iteration of process 600A. In some embodiments, the encoder can perform process 600A in parallel for regions of each original picture of video sequence 602.

In FIG. 6A, the encoder can feed a basic processing unit (referred to as an "original BPU") of an original picture of video sequence 602 to prediction stage 604 to generate prediction data 606 and predicted BPU 608. The encoder can subtract predicted BPU 608 from the original BPU to generate residual BPU 610. The encoder can feed residual BPU 610 to transform stage 612 and quantization stage 614 to generate quantized transform coefficients 616. The encoder can feed prediction data 606 and quantized transform coefficients 616 to binary coding stage 626 to generate video bitstream 628. Components 602, 604, 606, 608, 610, 612, 614, 616, 626, and 628 can be referred to as a "forward path." During process 600A, after quantization stage 614, the encoder can feed quantized transform coefficients 616 to inverse quantization stage 618 and inverse transform stage 620 to generate reconstructed residual BPU 622. The encoder can add reconstructed residual BPU 622 to predicted BPU 608 to generate prediction reference 624, which is used in prediction stage 604 for the next iteration of process 600A. Components 618, 620, 622, and 624 of process 600A can be referred to as a "reconstruction path." The reconstruction path can be used to ensure that both the encoder and the decoder use the same reference data for prediction.

The encoder can perform process 600A iteratively to encode each original BPU of the original picture (in the forward path) and generate prediction reference 624 for encoding the next original BPU of the original picture (in the reconstruction path). After encoding all original BPUs of the original picture, the encoder can proceed to encode the next picture in video sequence 602.

Referring to process 600A, the encoder can receive video sequence 602 generated by a video capturing device (e.g., a camera). The term "receive" used herein can refer to receiving, inputting, acquiring, retrieving, obtaining, reading, accessing, or any action in any manner for inputting data.

At prediction stage 604, at a current iteration, the encoder can receive an original BPU and prediction reference 624, and perform a prediction operation to generate prediction data 606 and predicted BPU 608. Prediction reference 624 can be generated from the reconstruction path of the previous iteration of process 600A. The purpose of prediction stage 604 is to reduce information redundancy by extracting prediction data 606 that can be used to reconstruct the original BPU as predicted BPU 608 from prediction data 606 and prediction reference 624.

Ideally, predicted BPU 608 can be identical to the original BPU. However, due to non-ideal prediction and reconstruction operations, predicted BPU 608 is generally slightly different from the original BPU. For recording such differences, after generating predicted BPU 608, the encoder can subtract it from the original BPU to generate residual BPU 610. For example, the encoder can subtract values (e.g., greyscale values or RGB values) of pixels of predicted BPU 608 from values of corresponding pixels of the original BPU. Each pixel of residual BPU 610 can have a residual value as a result of such subtraction between the corresponding pixels of the original BPU and predicted BPU 608. Compared with the original BPU, prediction data 606 and residual BPU 610 can have fewer bits, but they can be used to reconstruct the original BPU without significant quality deterioration. Thus, the original BPU is compressed.

To further compress residual BPU 610, at transform stage 612, the encoder can reduce spatial redundancy of residual BPU 610 by decomposing it into a set of two-dimensional "base patterns," each base pattern being associated with a "transform coefficient." The base patterns can have the same size (e.g., the size of residual BPU 610). Each base pattern can represent a variation frequency (e.g., frequency of brightness variation) component of residual BPU 610. None of the base patterns can be reproduced from any combinations (e.g., linear combinations) of any other base patterns. In other words, the decomposition can decompose variations of residual BPU 610 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 612, such as, for example, a discrete cosine transform, a discrete sine transform, or the like. The transform at transform stage 612 is invertible. That is, the encoder can restore residual BPU 610 by an inverse operation of the transform (referred to as an "inverse transform"). For example, to restore a pixel of residual BPU 610, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 610 without receiving the base patterns from the encoder. Compared with residual BPU 610, the transform coefficients can have fewer bits, but they can be used to reconstruct residual BPU 610 without significant quality deterioration. Thus, residual BPU 610 is further compressed.

The encoder can further compress the transform coefficients at quantization stage 614. In the transform process, different base patterns can represent different variation frequencies (e.g., brightness variation frequencies). For example, at quantization stage 614, the encoder can generate quantized transform coefficients 616 by dividing each transform coefficient by an integer value (referred to as a "quantization parameter" or QP) and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 616, by which the transform coefficients are further compressed. The quantization process is also invertible, in which quantized transform coefficients 616 can be reconstructed to the transform coefficients in an inverse operation of the quantization (referred to as "inverse quantization").

Because the encoder disregards the remainders of such divisions in the rounding operation, quantization stage 614 can be lossy. Typically, quantization stage 614 can contribute the most information loss in process 600A. The larger the information loss is, the fewer bits the quantized transform coefficients 616 can be fed. For obtaining different levels of information loss, the encoder can use different values of the quantization parameter or any other parameter of the quantization process.

At binary coding stage 626, the encoder can encode prediction data 606 and quantized transform coefficients 616 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 606 and quantized transform coefficients 616, the encoder can encode other information at binary coding stage 626, such as, for example, a prediction mode used at prediction stage 604, parameters of the prediction operation, a transform type at transform stage 612, parameters of the quantization process (e.g., quantization parameters), an encoder control parameter (e.g., a bitrate control parameter), or the like. The encoder can use the output data of binary coding stage 626 to generate video bitstream 628. In some embodiments, video bitstream 628 can be further packetized for network transmission.

Referring to the reconstruction path of process 600A, at inverse quantization stage 618, the encoder can perform inverse quantization on quantized transform coefficients 616 to generate reconstructed transform coefficients. At inverse transform stage 620, the encoder can generate reconstructed residual BPU 622 based on the reconstructed transform coefficients. The encoder can add reconstructed residual BPU 622 to predicted BPU 608 to generate prediction reference 624 that is to be used in the next iteration of process 600A.

It should be noted that other variations of the process 600A can be used to encode video sequence 602. In some embodiments, stages of process 600A can be performed by the encoder in different orders. In some embodiments, one or more stages of process 600A can be combined into a single stage. In some embodiments, a single stage of process 600A can be divided into multiple stages. For example, transform stage 612 and quantization stage 614 can be combined into a single stage. In some embodiments, process 600A can include additional stages. In some embodiments, process 600A can omit one or more stages in FIG. 6A.

Figure 6B:
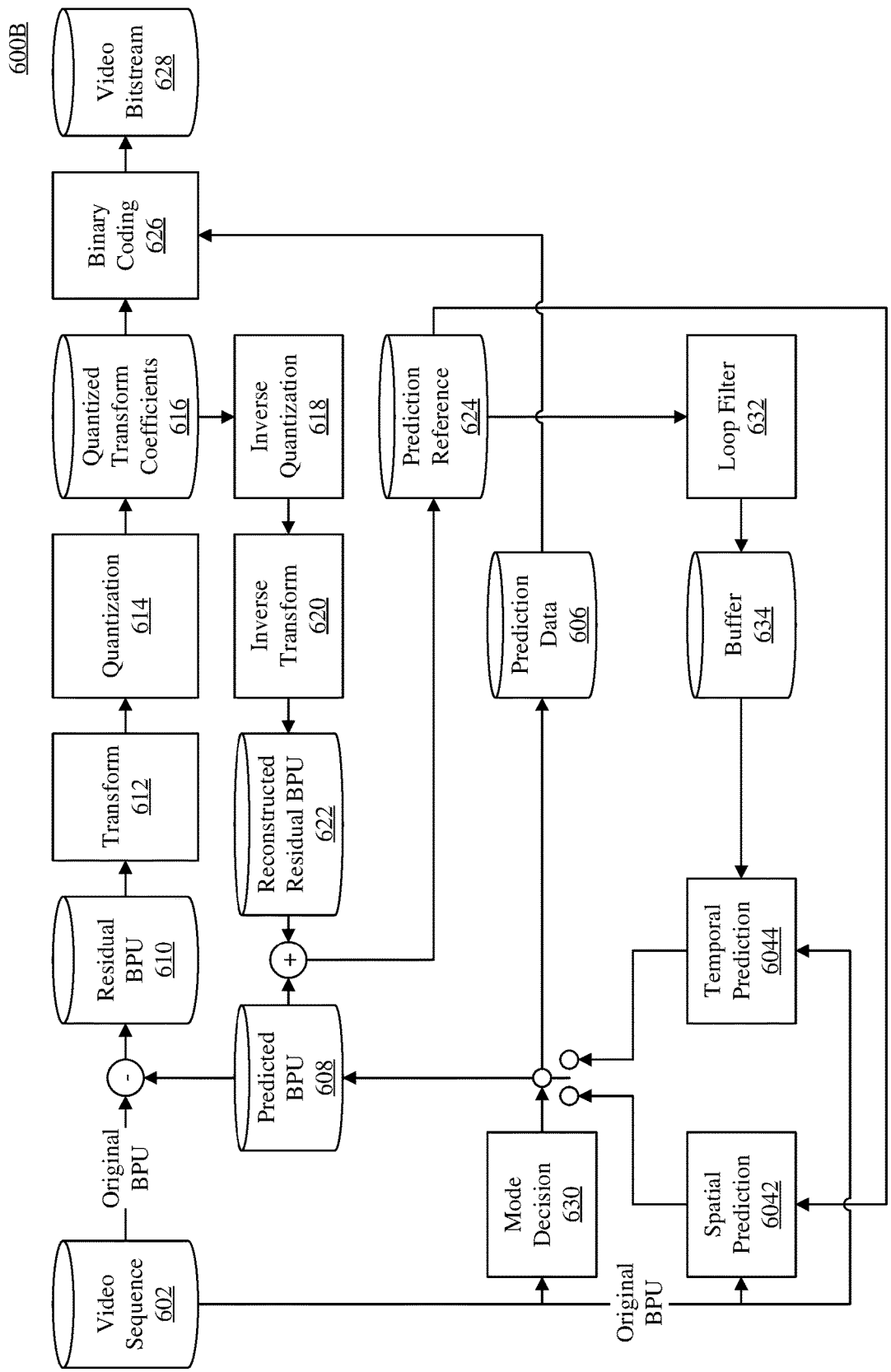
FIG. 6B is a diagram illustrating another example encoding process, according to some embodiments of the present disclosure.

FIG. 6B shows a schematic of another example encoding process, according to some embodiments of the present disclosure. As shown in FIG. 6B, process 600B can be modified from process 600A. For example, process 600B can be used by an encoder conforming to a hybrid video coding standard (e.g., H.26x series). Compared with process 600A, the forward path of process 600B additionally includes mode decision stage 630 and divides prediction stage 604 into spatial prediction stage 6042 and temporal prediction stage 6044. The reconstruction path of process 600B additionally includes loop filter stage 632 and buffer 634.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 624 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 624 in the temporal prediction can include the coded pictures. The temporal prediction can reduce the inherent temporal redundancy of the pictures.

Referring to process 600B, in the forward path, the encoder performs the prediction operation at spatial prediction stage 6042 and temporal prediction stage 6044. For example, at spatial prediction stage 6042, the encoder can perform the intra prediction. For an original BPU of a picture being encoded, prediction reference 624 can include one or more neighboring BPUs that have been encoded (in the forward path) and reconstructed (in the reconstructed path) in the same picture. The encoder can generate predicted BPU 608 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 608. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 606 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 6044, the encoder can perform the inter prediction. For an original BPU of a current picture, prediction reference 624 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 622 to predicted BPU 608 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 606 can include, for example, locations (e.g., coordinates) of the matching region, the motion vectors associated with the matching region, the number of reference pictures, weights associated with the reference pictures, or the like.

For generating predicted BPU 608, the encoder can perform an operation of "motion compensation." The motion compensation can be used to reconstruct predicted BPU 608 based on prediction data 606 (e.g., the motion vector) and prediction reference 624. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, for a picture being a unidirectional inter-predicted picture, the reference picture precedes the picture. Bidirectional inter predictions can use one or more reference pictures at both temporal directions with respect to the current picture. For example, for a picture being a bidirectional inter-predicted picture, the reference pictures are at both temporal directions with respect to the picture.

Still referring to the forward path of process 600B, after spatial prediction stage 6042 and temporal prediction stage 6044, at mode decision stage 630, the encoder can select a prediction mode (e.g., one of the intra prediction or the inter prediction) for the current iteration of process 600B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 608 and prediction data 606.

In the reconstruction path of process 600B, if intra prediction mode has been selected in the forward path, after generating prediction reference 624 (e.g., the current BPU that has been encoded and reconstructed in the current picture), the encoder can directly feed prediction reference 624 to spatial prediction stage 6042 for later usage (e.g., for extrapolation of a next BPU of the current picture). If the inter prediction mode has been selected in the forward path, after generating prediction reference 624 (e.g., the current picture in which all BPUs have been encoded and reconstructed), the encoder can feed prediction reference 624 to loop filter stage 632, at which the encoder can apply a loop filter to prediction reference 624 to reduce or eliminate distortion (e.g., blocking artifacts) introduced by the inter prediction. The encoder can apply various loop filter techniques at loop filter stage 632, such as, for example, deblocking, sample adaptive offsets, adaptive loop filters, or the like. The loop-filtered reference picture can be stored in buffer 634 (or "decoded picture buffer") for later use (e.g., to be used as an inter-prediction reference picture for a future picture of video sequence 602). The encoder can store one or more reference pictures in buffer 634 to be used at temporal prediction stage 6044. In some embodiments, the encoder can encode parameters of the loop filter (e.g., a loop filter strength) at binary coding stage 626, along with quantized transform coefficients 616, prediction data 606, and other information.

Figure 7A:
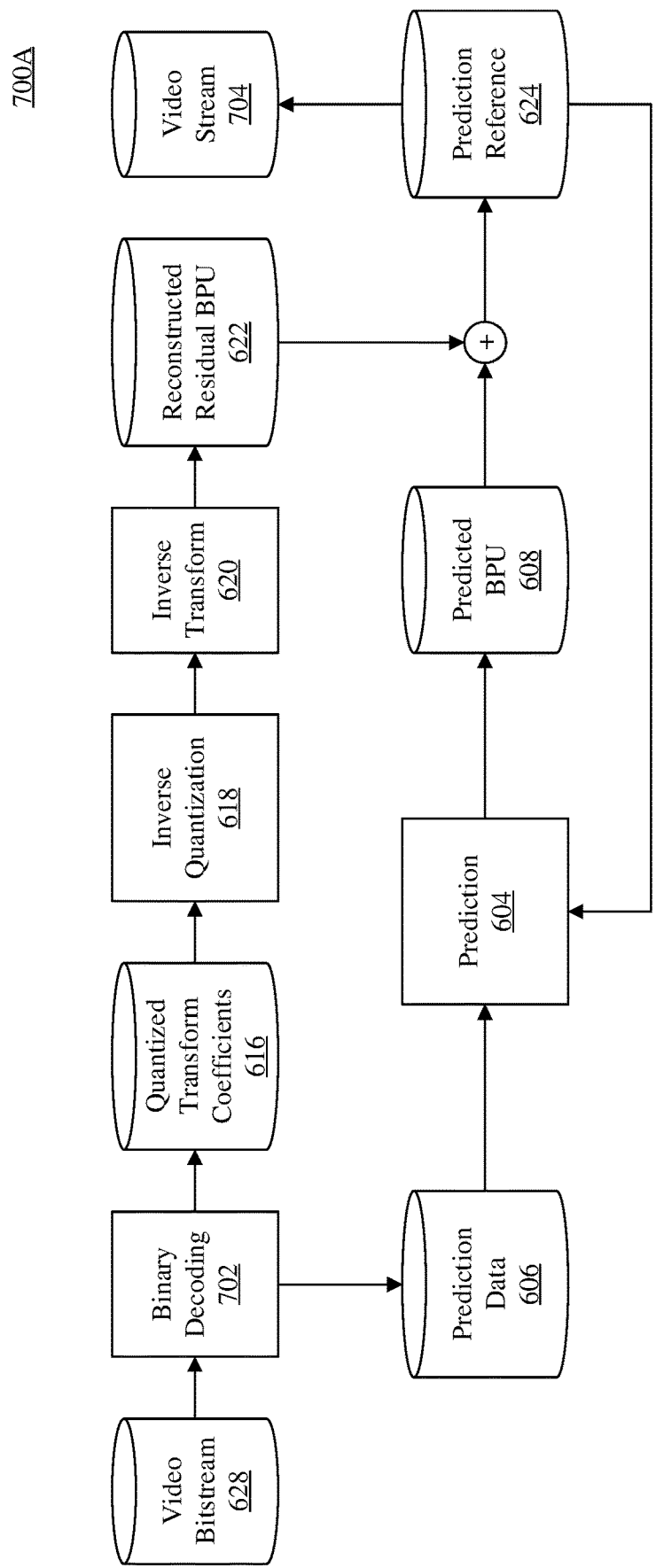
FIG. 7A is a diagram illustrating an example decoding process, according to some embodiments of the present disclosure.

FIG. 7A shows a schematic of an example decoding process, according to some embodiments of the present disclosure. As shown in FIG. 7A, process 700A can be a decompression process corresponding to the encoding process 600A in FIG. 6A. In some embodiments, process 700A can be similar to the reconstruction path of process 600A. A decoder can decode video bitstream 628 into video stream 704 according to process 700A. Video stream 704 can be very similar to video sequence 602. However, due to the information loss in the compression and decompression process (e.g., quantization stage 614 in FIGS. 6A-6B), generally, video stream 704 may not be identical to video sequence 602. Similar to processes 600A and 600B in FIGS. 6A-6B, the decoder can perform process 700A at the level of basic processing units (BPUs) for each picture encoded in video bitstream 628. For example, the decoder can perform process 700A in an iterative manner, in which the decoder can decode a basic processing unit in one iteration of process 700A. In some embodiments, the decoder can perform process 700A in parallel for regions of each picture encoded in video bitstream 628.

In FIG. 7A, the decoder can feed a portion of video bitstream 628 associated with a basic processing unit (referred to as an "encoded BPU") of an encoded picture to binary decoding stage 702. At binary decoding stage 702, the decoder can decode the portion into prediction data 606 and quantized transform coefficients 616. The decoder can feed quantized transform coefficients 616 to inverse quantization stage 618 and inverse transform stage 620 to generate reconstructed residual BPU 622. The decoder can feed prediction data 606 to prediction stage 604 to generate predicted BPU 608. The decoder can add reconstructed residual BPU 622 to predicted BPU 608 to generate prediction reference 624. In some embodiments, prediction reference 624 can be stored in a buffer (e.g., a decoded picture buffer in a computer memory). The decoder can feed prediction reference 624 to prediction stage 604 for performing a prediction operation in the next iteration of process 700A.

The decoder can perform process 700A iteratively to decode each encoded BPU of the encoded picture and generate prediction reference 624 for encoding the next encoded BPU of the encoded picture. After decoding all encoded BPUs of the encoded picture, the decoder can output the picture to video stream 704 for display and proceed to decode the next encoded picture in video bitstream 628.

At binary decoding stage 702, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 606 and quantized transform coefficients 616, the decoder can decode other information at binary decoding stage 702, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 628 is transmitted over a network in packets, the decoder can depacketize video bitstream 628 before feeding it to binary decoding stage 702.

Figure 7B:
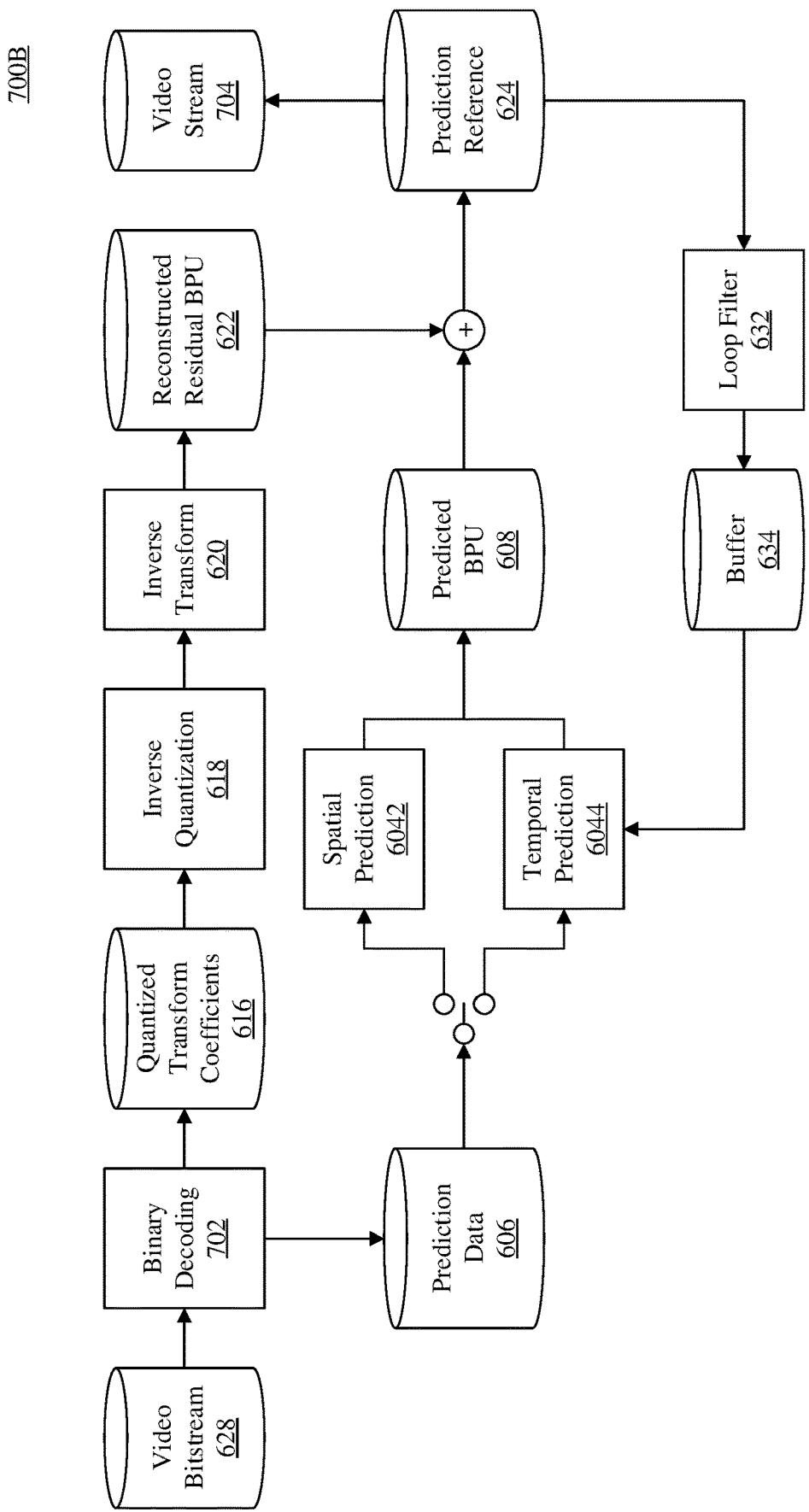
FIG. 7B is a diagram illustrating another example decoding process, according to some embodiments of the present disclosure.

FIG. 7B shows a schematic of another example decoding process, according to some embodiments of the present disclosure. As shown in FIG. 7B, process 700B can be modified from process 700A. For example, process 700B can be used by a decoder conforming to a hybrid video coding standard (e.g., H.26x series). Compared with process 700A, process 700B additionally divides prediction stage 604 into spatial prediction stage 6042 and temporal prediction stage 6044, and additionally includes loop filter stage 632 and buffer 634.

In process 700B, for an encoded basic processing unit (referred to as a "current BPU") of an encoded picture (referred to as a "current picture") that is being decoded, prediction data 606 decoded from binary decoding stage 702 by the decoder can include various types of data, depending on what prediction mode was used to encode the current BPU by the encoder. For example, if intra prediction was used by the encoder to encode the current BPU, prediction data 606 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 606 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 6042 or a temporal prediction (e.g., the inter prediction) at temporal prediction stage 6044. The details of performing such spatial prediction or temporal prediction are described in FIG. 6B and will not be repeated hereinafter. After performing such spatial prediction or temporal prediction, the decoder can generate predicted BPU 608. The decoder can add predicted BPU 608 and reconstructed residual BPU 622 to generate prediction reference 624, as described in FIG. 7A.

In process 700B, the decoder can feed prediction reference 624 to spatial prediction stage 6042 or temporal prediction stage 6044 for performing a prediction operation in the next iteration of process 700B. For example, if the current BPU is decoded using the intra prediction at spatial prediction stage 6042, after generating prediction reference 624 (e.g., the decoded current BPU), the decoder can directly feed prediction reference 624 to spatial prediction stage 6042 for later usage (e.g., for extrapolation of a next BPU of the current picture). If the current BPU is decoded using the inter prediction at temporal prediction stage 6044, after generating prediction reference 624 (e.g., a reference picture in which all BPUs have been decoded), the encoder can feed prediction reference 624 to loop filter stage 632 to reduce or eliminate distortion (e.g., blocking artifacts). The decoder can apply a loop filter to prediction reference 624, in a way as described in FIG. 6B. The loop-filtered reference picture can be stored in buffer 634 (e.g., a decoded picture buffer in a computer memory) for later use (e.g., to be used as an inter-prediction reference picture for a future encoded picture of video bitstream 628). The decoder can store one or more reference pictures in buffer 634 to be used at temporal prediction stage 6044. In some embodiments, when the prediction mode indicator of prediction data 606 indicates that inter prediction was used to encode the current BPU, prediction data can further include parameters of the loop filter (e.g., a loop filter strength).

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components. The first component can be an in-loop mapping of the luma component based on adaptive piecewise linear models. The second component can be for the chroma components, and luma-dependent chroma residual scaling can be applied.

Figure 8:
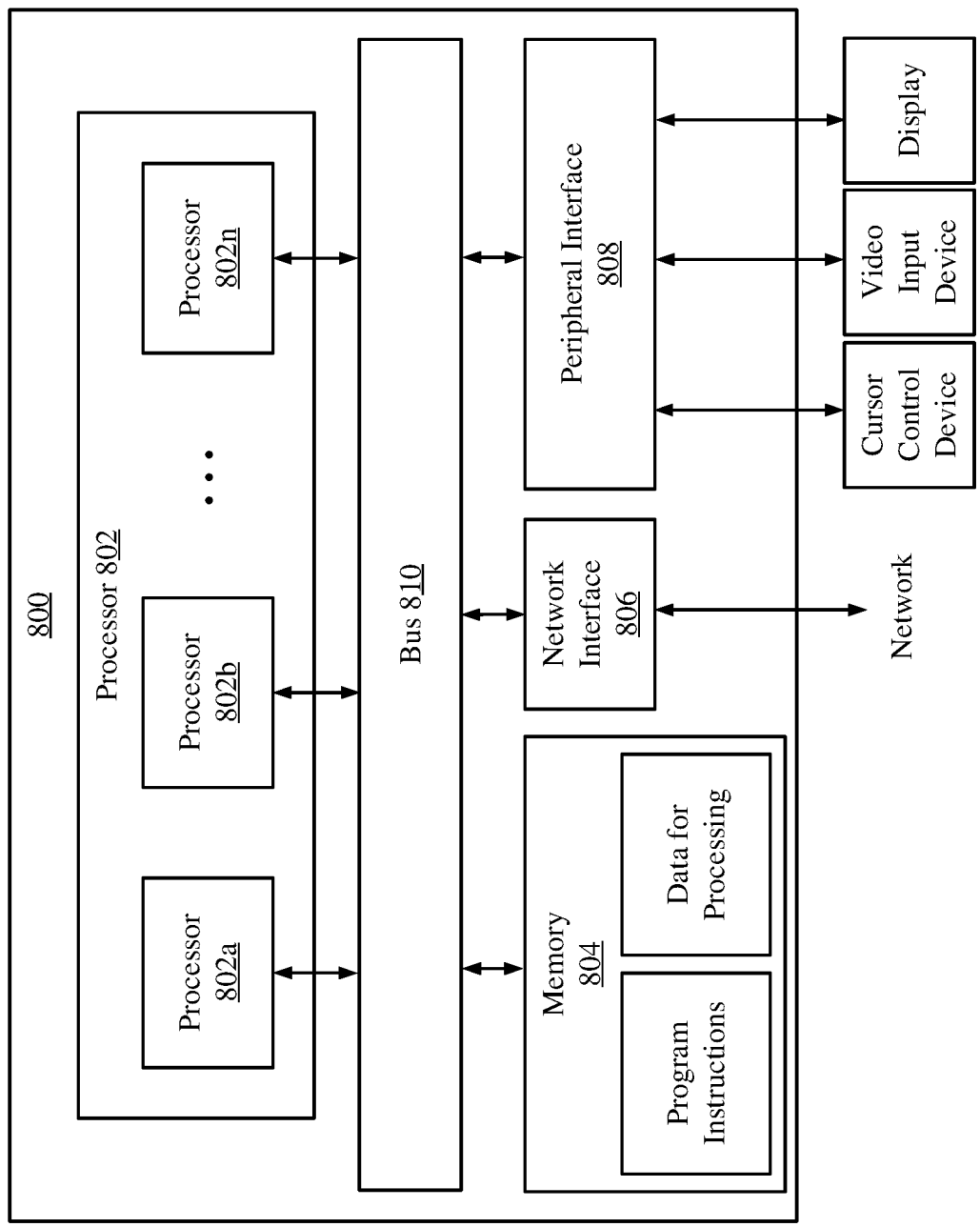
FIG. 8 is a block diagram of an example apparatus for processing a video, according to some embodiments of the present disclosure.

FIG. 8 is a block diagram of an example apparatus 800 for processing a video (e.g., compressing, encoding, or decoding), according to some embodiments of the present disclosure. As shown in FIG. 8, apparatus 800 can include processor 802. When processor 802 executes instructions described herein, apparatus 800 can become a specialized machine for video resampling, encoding, and decoding. Processor 802 can be any type of circuitry capable of manipulating or processing information. For example, processor 802 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 802 can also be a set of processors grouped as a single logical component. For example, as shown in FIG. 8, processor 802 can include multiple processors, including processor 802a, processor 802b, and processor 802n. In some embodiments, at least one of processors 802a-802n can include a hardware accelerator.

Apparatus 800 can also include memory 804 configured to store data (e.g., a set of instructions, computer codes, intermediate data, or the like). For example, as shown in FIG. 8, the stored data can include program instructions (e.g., program instructions for implementing the resampling, construction, or training) and data for processing (e.g., video sequence 602, or video bitstream 628). Processor 802 can access the program instructions and data for processing (e.g., via bus 810), and execute the program instructions to perform an operation or manipulation on the data for processing. Memory 804 can include a high-speed random-access storage device or a non-volatile storage device. In some embodiments, memory 804 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 8) grouped as a single logical component.

Bus 810 can be a communication device that transfers data between components inside apparatus 800, such as an internal bus (e.g., a CPU-memory bus), an external bus (e.g., a universal serial bus port, a peripheral component interconnect express port), or the like.

For ease of explanation without causing ambiguity, processor 802 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 800.

Apparatus 800 can further include network interface 806 to provide wired or wireless communication with a network (e.g., the Internet, an intranet, a local area network, a mobile communications network, or the like). In some embodiments, network interface 806 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 800 can further include peripheral interface 808 to provide a connection to one or more peripheral devices. As shown in FIG. 8, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

Figure 9:
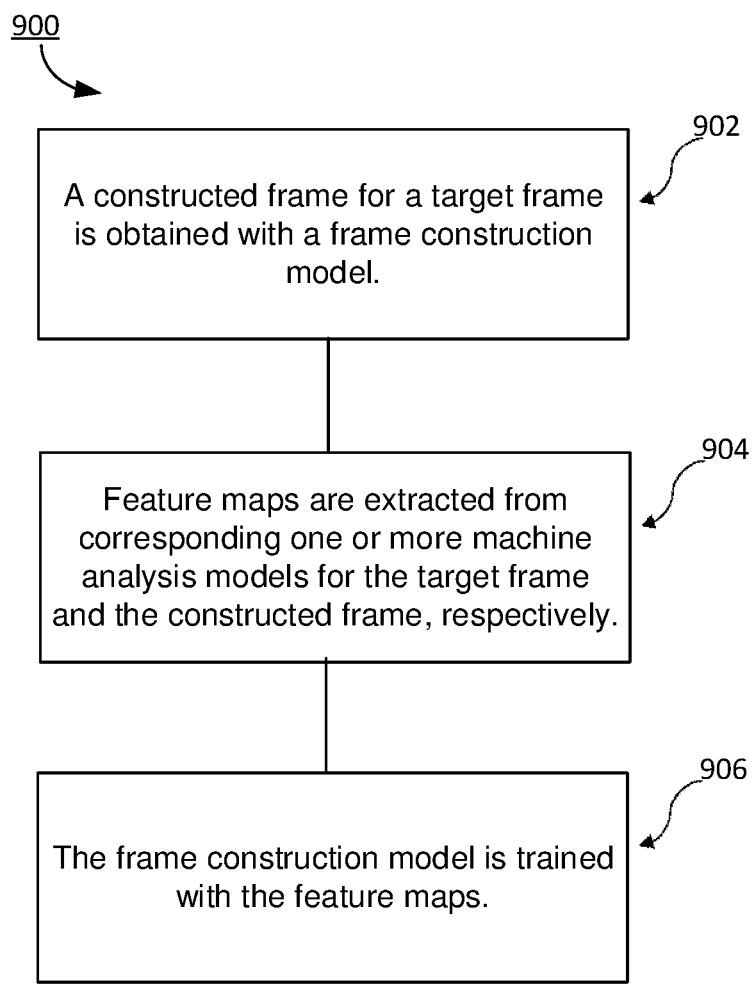
FIG. 9 illustrates a flowchart of an exemplary method for training a frame construction model, according to some embodiments of the present disclosure.

FIG. 9 illustrates a flowchart of an exemplary method 900 for training a frame construction model, according to some embodiments of the present disclosure. For example, method 900 can be performed or implemented by software stored in a machine learning device or system, or performed by one or more software or hardware components of an apparatus (e.g., apparatus 800 of FIG. 8). For example, one or more processors (e.g., processor 802 of FIG. 8) can perform method 900. In some embodiments, method 900 can be implemented by a computer program product, embodied in a computer-readable medium, including computer-executable instructions, such as program code, executed by computers (e.g., apparatus 800 of FIG. 8). Method 900 may include the following steps 902 and 904.

Combined with reference to FIG. 3, at step 902, a constructed frame (e.g., $x'_{i+j}$ in FIG. 3) for a target frame (e.g., $x_{i+j}$ in FIG. 3) is obtained with a frame construction model (e.g., frame construction model F 310 in FIG. 3). In some embodiments, the target frame is a frame after temporal resampled with a resampling factor. Referring to FIG. 3, in some embodiments, the target frame is the removed frame $x_{i+j}$ after temporal resampled with a resampling factor f. An averaged residual r of the target frame $x_{i+j}$ (e.g., the $(i+j)^{th}$ frame) is achieved from a residual between the preserved frames $x_i$ and $x_{i+f}$. The averaged residual r indicates a temporal movement tendency, which can be denoted as $r=(x_{i+f}-x_i)/f$. A naïve prediction of target frame $x_{i+j}$ (e.g., the $(i+j)^{th}$ frame), which is denoted as $x_{i+j,n}$, from the $i^{th}$ frame $x_i$ is a sum of the preserved frames $x_i$ and the averaged residual r, denoted as $x_{i+j,n}=x_i+jr$. An input of frame construction model F 310 is a channel-wise concatenation of the average residual r and the naïve prediction $x_{i+j,n}$. The constructed frame $x'_{i+j}$ of the target frame $x_{i+j}$, which is removed after temporal resampling, can be obtained as an output of the frame construction model F 310.

At step 904, feature maps are extracted from corresponding one or more machine analysis models for the target frame and the constructed frame, respectively. Referring to FIG. 3, in order to preserve the machine analysis features for multiple tasks, the feature maps from various machine analysis models (e.g., $M_1, \ldots, M_n$), are extracted from both target frame $x_{i+j}$ and the constructed frame $x'_{i+j}$. The feature maps for the target frames and the constructed frames from the plurality of machine analysis models can be denoted as $\{f_1, \ldots, f_n\}$ and $\{f'_1, \ldots, f'_n\}$ respectively.

At step 906, the frame construction model F 310 is trained with the feature maps $\{f_1, \ldots, f_n\}$ and $\{f'_1, \ldots, f'_n\}$.

In some embodiments, a loss functions $\{L_{ana,i}\}$ of various machine analysis models (e.g., $M_1, \ldots, M_n$) are also achieved with label information $\{l_i\}$, and can be proposed for training the frame construction model. The label information can be obtained by a data labeling process, in which raw data (e.g., images, text files, videos, etc.) are identified and one or more meaningful and informative labels are added to provide context. The various machine analysis models can learn the raw data from the label information.

After temporal resampling, a plurality of frames are removed for reducing the data volume. With the frame construction model, such removed frames can be constructed for the machine analysis models for multiple tasks, which can improve the training efficiency and accuracy.

Figure 10:
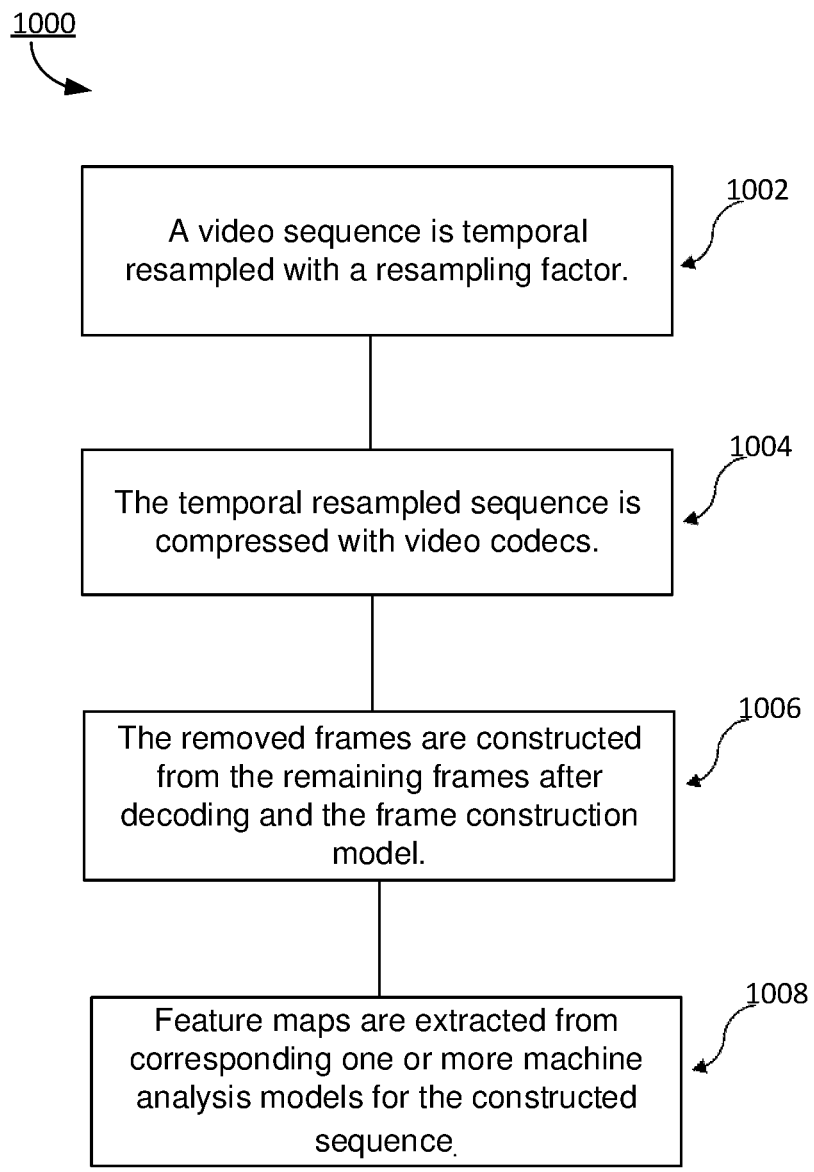
FIG. 10 illustrates a flowchart of an exemplary method for temporal resampling of video compression for multi-task machine vision in testing stage, according to some embodiments of the present disclosure.

FIG. 10 illustrates a flowchart of an exemplary method 1000 for temporal resampling of video compression for multi-task machine vision in testing stage, according to some embodiments of the present disclosure. Method 1000 can be performed by one or more software or hardware components of an apparatus (e.g., apparatus 800 of FIG. 8). For example, one or more processors (e.g., processor 802 of FIG. 8) can perform method 1000. In some embodiments, method 1000 can be implemented by a computer program product, embodied in a computer-readable medium, including computer-executable instructions, such as program code, executed by computers (e.g., apparatus 800 of FIG. 8). Method 1000 may include the following steps 1002-1006.

Combined with reference to FIG. 3 and FIG. 5, at step 1002, a video sequence (e.g., input sequence S in FIG. 5) is temporal resampled with a resampling factor (e.g., resampling factor f in FIG. 3), for example by a resampling module (e.g., resampling module 510 in FIG. 5). A compressed video sequence can be obtained including only the preserved frames (e.g., $x_i$ and $x_{i+f}$ in FIG. 3) for transmission. Therefore, video sequence volume is reduced.

At step 1004, the temporal resampled sequence (e.g., $S_R$ in FIG. 5) is compressed with video codecs (e.g., by encoder 532 in FIG. 5). The resampled sequence $S_R$ includes frames $x_i$ and $x_{i+f}$ shown in FIG. 3. In some embodiments, the compressed video sequence is encoded and transmitted to encoder 534 in bitstream b (shown in FIG. 5).

At step 1006, the removed frames (e.g., $x_{i+j}$ in FIG. 3) are constructed from the remaining frames (e.g., $x_i$ in FIG. 3) after decoding (e.g., by decoder 534) and the frame construction model 520. For example, as shown in FIG. 5, a decoder is used to decode the bitstream b to extract general visual information (e.g., resampling factor f) from the bitstream b and generate a reconstructed sequence (e.g., a reconstructed compact sequence $\hat{S}_R$, including reconstructed frames $x'_i$ and $x'_{i+j}$). The removed frames (e.g., $x_{i+j}$) are constructed from the reconstructed frames (e.g., $x'_i$) of the remaining frames (e.g., $x_i$) at the frame construction model F 520. Finally, a fully constructed sequence $S_C$ (e.g., including decoded frame $x'_i$ and constructed frame $x'_{i+j}$) can be obtained and fed for multi-task machine vision analysis.

At step 1008, feature maps are extracted from corresponding one or more machine analysis models for the constructed sequence $S_C$.

The compression efficiency for the machine vision could be improved by reducing the data volume before compression and by recovering machine analysis information of the removed frames after reconstruction.

In some embodiments, in order to improve coding performance for multi-task machine analysis, the loss function can be determined by one or more contour loss, feature map distortion of the one or more feature maps, and the one or more loss functions from various pretrained machine analysis models (e.g., $M_1, \ldots, M_n$).

A multi-task loss function is introduced in terms of the feature map distortion and the machine analysis loss function for every machine task, to preserve the information of various machine tasks. For example, for $i^{th}$ machine task, the feature map distortion $L_{fea,i}$ is a mean squared difference of the analysis model feature maps from original frame and the constructed frame, which could be formulated as:

$$L_{fea,i}(x,x')=\|f_i-\hat{f}_i\|_2^2/N_f,$$

where $f_i$ and $\hat{f}_i$ are the extracted feature maps of pretrained machine analysis model $M_i$ from input frame x and the constructed frame x' respectively. $N_f$ is the feature map size.

Similarly, the loss function of specific machine analysis $L_{ana,j}$ follows the definition of $j^{th}$ analysis model.

In some embodiments, the loss function could be formulated as:

$$L(x,x_m,x')=w_C L_C(x,x_m,x')+\Sigma_i^n w_{fea,i} L_{fea,i}(x,x')+\Sigma_j^n w_{ana,j} L_{ana,j}(x',\{l_i\}),$$

where $w_C$ is a weight of a contour loss, $\{w_i\}$ is weights for each machine analysis model. For example, $w_{fea,i}$ is a weight of a loss function of the $i^{th}$ multi-task, $w_{ana,j}$ is a weight of the loss function of the $j^{th}$ multi-task. Specifically, $L_C$ is a contour loss that pays more attention to the object contours, which is formulated as:

$$L_C(x,x_m,x')=(G(K(C(x_m)))+1)\|x'-x\|_2^2,$$

$$C(x_m)=D(x_m;S)-E(x_m;S),$$

where $x_m$ is a mask for the annotated objects in a dataset, such as COCO and Open Images, for example, D and E are the dilation and erosion with a mask S. In some embodiments, the mask S is a 5×5 mask. $C(x_m)$ denotes a difference between dilated and eroded images, which is associated with the object boundaries. Moreover, K is a hyperparameter to assign high values for contour parts. In some embodiments, K is set as 5. G is a Gaussian filter with a same range as the mask S. In this example, G is a Gaussian filter with 5×5 range. 1 is a matrix with the same size of $x_m$ and all values are 1. The target frame $x_{i+j}$ that would be resampled is denoted as x for convenience in this example. It could be understood that above equations are merely examples and not meant to limit the present disclosure.

In some embodiments, the weights and the components of the loss function could be adaptively adjusted according to the application scenarios.

In some embodiments, an adaptive temporal resampling method is proposed, considering a moving complexity of video and a compression ratio. Whether to perform the above-described method for temporal resampling of video compression for multi-task machine vision can be adaptively determined based on the moving complexity and the compression ratio. In generally, the lower moving complexity, the better performance improvement of temporal resampling can be achieved. A moving complexity criterion for adaptive temporal resampling is therefore defined.

Figure 11:
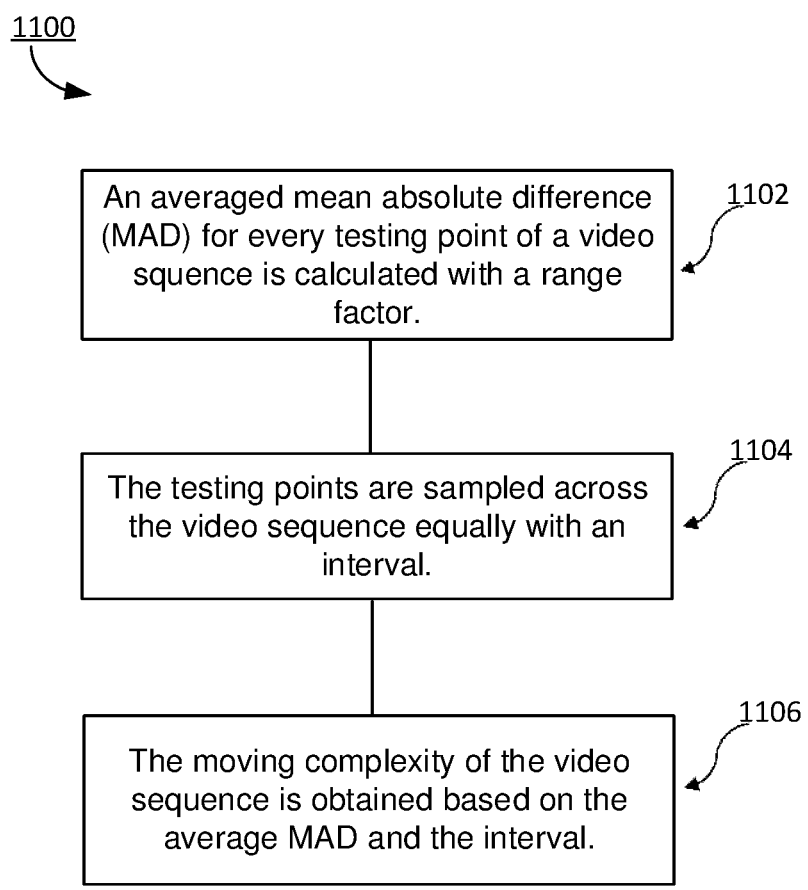
FIG. 11 illustrates a flowchart of an exemplary method for obtaining the moving complexity, according to some embodiments of the present disclosure.

FIG. 11 illustrates a flowchart of an exemplary method 1100 for obtaining the moving complexity, according to some embodiments of the present disclosure. Method 1100 can be performed by one or more software or hardware components of an apparatus (e.g., apparatus 800 of FIG. 8). For example, one or more processors (e.g., processor 802 of FIG. 8) can perform method 1100. In some embodiments, method 1100 can be implemented by a computer program product, embodied in a computer-readable medium, including computer-executable instructions, such as program code, executed by computers (e.g., apparatus 800 of FIG. 8). Referring to FIG. 11, method 1100 may include the following steps 1102-1106.

At step 1102, an averaged mean absolute difference (MAD) for every testing point is calculated with a range factor f. Specifically, for example, a testing point is the $i^{th}$ frame $x_i$ for a video sequence, the averaged MAD $m_i$ of $i^{th}$ frame testing point is denoted as, $$m_i = \Sigma_{j=1}^{f} MAD(x_i, x_{i+j})/f.$$

At step 1104, the testing points are sampled across the video sequence equally with an interval d. For example, a number of testing points sampled $N_m$ are obtained by:

$$N_m = \lfloor N/d \rfloor,$$

where N is the frame number of the video sequence.

At step 1106, a moving complexity of the video sequence is obtained based on the average MAD and the interval d. For example, the moving complexity of the whole sequence m can be denoted as:

$$m = \frac{\sum_{k=1}^{N} m_k}{N_m}.$$

It could be understood that above equations are merely examples and not meant to limit the present disclosure.

Temporal resampling tends to achieve better performance for higher compression ratios. The compression ratio is highly relevant to a quantization parameter (QP) for the codec. In some embodiments, a compression ratio can be represented by the QP, which can be determined by, for example, quantization stage 614 of FIG. 6A-6B. A higher compression ratio corresponds to a higher QP value, and a lower compression ratio corresponds to a lower QP value.

Figure 12:
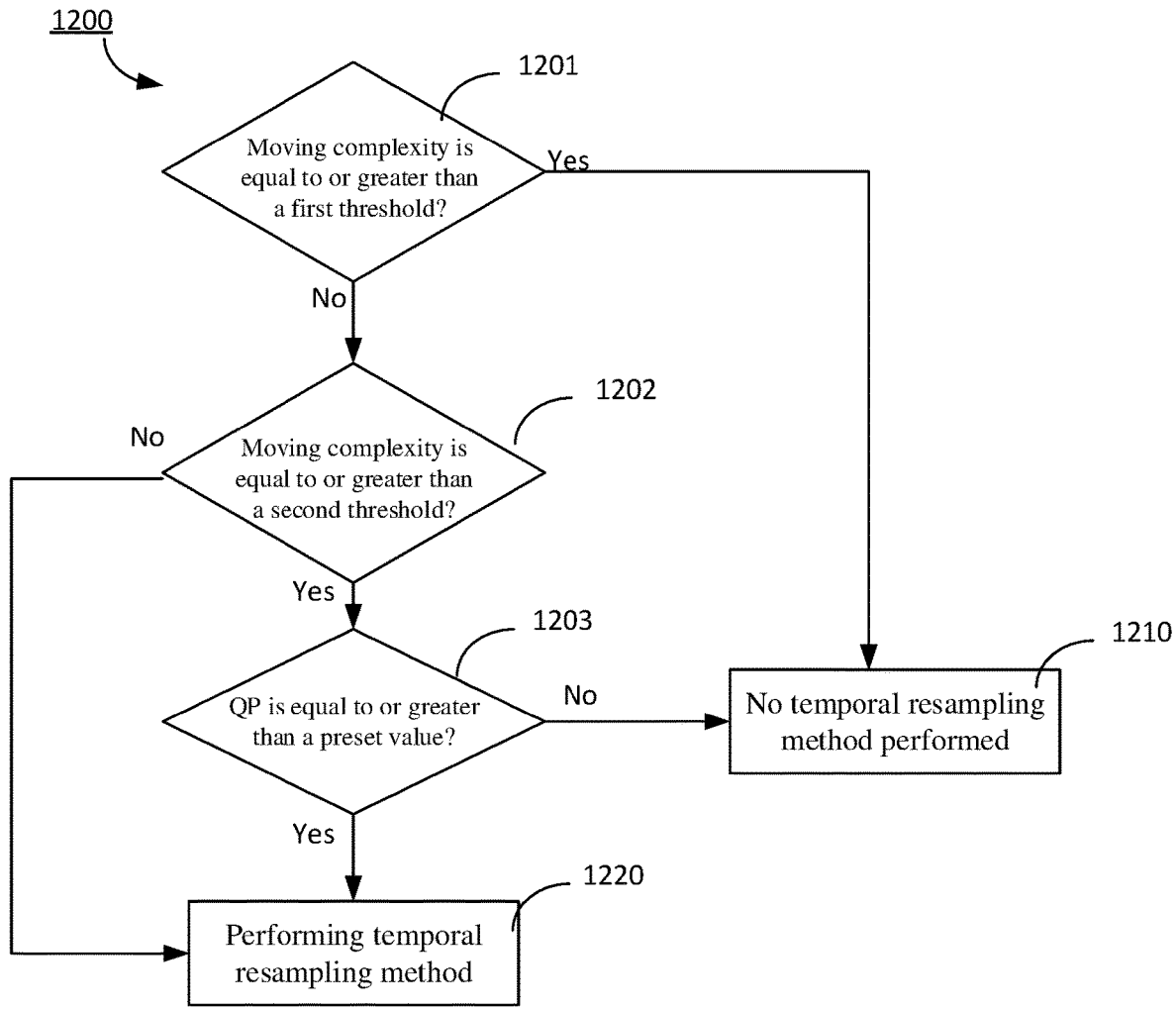
FIG. 12 illustrates a flowchart of an exemplary adaptive temporal resampling method 1200, according to some embodiments of the present disclosure.

FIG. 12 illustrates a flowchart of an exemplary adaptive temporal resampling method 1200, according to some embodiments of the present disclosure. Method 1200 can be performed by one or more software or hardware components of an apparatus (e.g., apparatus 800 of FIG. 8). For example, one or more processors (e.g., processor 802 of FIG. 8) can perform method 1200. In some embodiments, method 1200 can be implemented by a computer program product, embodied in a computer-readable medium, including computer-executable instructions, such as program code, executed by computers (e.g., apparatus 800 of FIG. 8). Referring to FIG. 12, method 1200 may include the following steps 1202-1220.

At step 1201, a determination is made whether the moving complexity is equal to or greater than a first threshold. If the moving complexity is equal to or greater than the first threshold, which means the moving complexity of the video sequence is high, there is no temporal resampling method performed 1210. For example, there is no temporal resampling performed on encoder side, and the frame construction model F is not applied. In some embodiments, the first threshold is greater than 5. In some embodiments, the first threshold is equal to 6.

If the moving complexity is less than the first threshold, a second threshold is further compared with the moving complexity. At step 1202, it is determined whether the moving complexity is equal to or greater than the second threshold. If the moving complexity is equal to or greater than the second threshold, which means the moving complexity of the video sequence is in a considerable range, however, whether to perform the temporal resampling needs to be further determined based on the compression ratio (turn to step 1203). If the moving complexity is still less than the second threshold, which means the moving complexity is lower, the temporal resampling method can be performed in step 1220, regardless of the compression ratio of the video sequence. For example, the temporal resampling is performed on the encoder side, and the frame construction model F is applied on the decoder side to construct the removed frames which are removed during the temporal resampling. In some embodiments, the second threshold is in a rage of 2 to 3. More specifically, the second threshold is equal to 2.5.

At step 1203, a determination is made whether a QP of the codec is equal to or greater than a preset value. If the QP is equal to or greater than the preset value, which means the compression ratio is high, the temporal resampling method is performed 1220. If the QP is less than the preset value, which means the compression ratio is low, there is no temporal resampling method performed 1210. In some embodiments, the preset value of the QP is greater than 40. More specifically, the preset value is equal to 47.

With this proposed adaptive temporal resampling method, the temporal resampling is adaptively performed on the encoder side based on features (e.g., moving complexity and/or a quantization parameter) of a video sequence. When the temporal resampling is performed on the video sequence before encoding, the removed frames can be constructed by a trained frame construction module F after decoding.

In some embodiments, a flag is signaled in the bitstream to indicate whether the temporal resampling is performed. If the flag indicates that there is no temporal resampling performed, the frame construction model F is not applied. If the flag indicates that the temporal resampling is performed on the video sequence, the frame construction model F is applied to construct the removed frames.

In some embodiments, whether to perform the temporal resampling method can be inferred by the encoder and the decoder. For example, an index is signaled to indicate the moving complexity of the video sequence. Whether to apply the frame construction model F can be determined based on the index.

In some embodiments, the adaptive temporal resampling and construction method can also be expressed as:

if $m<2.5$, perform temporal resampling for all QPs if $2.5 \leq m \leq 6.0$, perform temporal resampling for QPs$\geq$47 if $m \geq 6.0$, no temporal resampling.

In some embodiments, the proposed temporal resampling method towards machine vision can be applied with any video codecs known by the skilled person in the field. Embodiments of the present disclosure can preserve the machine vision-oriented information and is applicable to various machine analysis tasks.

In some embodiments, the proposed temporal resampling method can be combined with spatial resampling for video compression.

The embodiments may further be described using the following clauses:

1. A method for training a frame construction model for temporal resampling, comprising:
obtaining a constructed frame of a target frame using a frame construction model, wherein an input of the frame construction model is a channel-wise concatenation of an average residual of the target frame and a prediction of the target frame, the average residual of the target frame is obtained based on resampled frames and a resampling factor;
extracting feature maps from corresponding one or more machine analysis models for the target frame and the constructed frame of the target frame, respectively; and
training the frame construction model with the feature maps.

2. The method according to clause 1, wherein the average residual is obtained using the resampling factor and a frame from a video sequence.

3. The method according to clause 1 or 2, wherein the prediction is obtained using the average residual.

4. The method according any one of clauses 1 to 3, further comprising:
obtaining one or more loss functions of corresponding one or more machine analysis models with label information.

5. The method according to clause 4, further comprising:
determining a total loss function using contour loss, feature map distortion of the one or more feature maps, and the one or more loss functions.

6. The method according to clause 5, wherein the loss function of each of the one or more machine analysis model is determined by a mean squared difference between a machine analysis model feature map of the target frame and a machine analysis model feature map of the constructed frame of the machine analysis model.

7. A method for temporal resampling for multi-task machine vision, comprising:
receiving a video sequence;
performing temporal resampling on the video sequence;
extracting feature maps from corresponding one or more machine analysis models for a target frame for training a frame construction model.

8. The method according to clause 7, further comprising:
obtaining an average residual of the target frame based on resampled frames and a resampling factor; and
obtaining a prediction of the target frame.

9. A method for temporal resampling for multi-task machine vision, comprising:
receiving a bitstream of a video sequence after temporal resampling; and
constructing a target frame from the bitstream using a frame construction model.

10. The method according to clause 9, wherein an input of the frame construction model is a channel-wise concatenation of an average residual of the target frame and a prediction of the target frame, the average residual of the target frame is obtained based on resampled frames and a resampling factor.

11. The method according to clause 9 or 10, wherein the frame construction model is trained with feature maps, the feature maps being extracted from corresponding one or more machine analysis models for the target frame and the constructed frame of the target frame, respectively.

12. A method for temporal resampling for multi-task machine vision, comprising:
receiving a video sequence;
determining a moving complexity of the video sequence; and
determining whether to perform temporal resampling based on the moving complexity.

13. The method according to clause 12, wherein determining whether to perform the temporal resampling based on the moving complexity further comprises:
not performing the temporal resampling when the moving complexity is greater than or equal to a first threshold; or
performing the temporal resampling when the moving complexity is less than a second threshold.

14. The method according to clause 13, when the moving complexity is less than the first threshold and greater than or equal to the second threshold, the method further comprises:
determining a quantization parameter associated with the video sequence; and
determining whether to perform the temporal resampling based on the quantization parameter.

15. The method according to clause 14, wherein determining whether to perform the temporal resampling based on the quantization parameter further comprises:
performing the temporal resampling when the quantization parameter is equal to or greater than a preset value.

16. The method according to any one of clauses 12 to 15, wherein determining the moving complexity of the video sequence further comprises:
calculating an average mean absolute difference (MAD) for a testing point with a range;
sampling all the testing points across the video sequence equally with an interval; and
obtaining the moving complexity of the video sequence based on the average MAD and the interval.

17. A method for temporal resampling for multi-task machine vision, comprising: receiving a bitstream of a video sequence; and
determining whether to construct a target frame from the bitstream using a frame construction model based a moving complexity.

18. The method according to clause 17, wherein the moving complexity is determined based on an index signaled in the bitstream.

19. The method according to clause 18, wherein determining whether to construct the target frame from the bitstream using the frame construction model based on the moving complexity further comprises:
skipping constructing the target frame from the bitstream using the frame construction model when the index indicates the moving complexity is greater than or equal to a first threshold; or
constructing the target frame from the bitstream using the frame construction model when the index indicates the moving complexity is less than a second threshold.

20. The method according to clause 19, when the index indicates the moving complexity is less than the first threshold and greater than or equal to the second threshold, the method further comprises:

determining a quantization parameter associated with the video sequence; and determining whether to construct the target frame from the bitstream using the frame construction model based on the quantization parameter.

21. The method according to clause 20, wherein determining whether to construct the target frame from the bitstream using the frame construction model based on the quantization parameter further comprises:

constructing the target frame from the bitstream using the frame construction model when the quantization parameter is equal to or greater than a preset value.

22. A method for temporal resampling for multi-task machine vision, comprising:

receiving a bitstream of a video sequence; and determining whether to construct a target frame from the bitstream using a frame construction model based on a flag signaled in the bitstream.

23. The method according to clause 22, further comprising:

skipping constructing the target frame from the bitstream using the frame construction model when the flag indicates the temporal resampling is not performed on the video sequence; or constructing the target frame from the bitstream using the frame construction model when the flag indicates the temporal resampling is performed on the video sequence.

24. An apparatus for training a frame construction model for temporal resampling, the apparatus comprising:

a memory figured to store instructions; and one or more processors configured to execute the instructions to cause the apparatus to perform:

obtaining a constructed frame of a target frame using a frame construction model, wherein an input of the frame construction model is a channel-wise concatenation of an average residual of the target frame and a prediction of the target frame, the average residual of the target frame is obtained based on resampled frames and a resampling factor;

extracting feature maps from corresponding one or more machine analysis models for the target frame and the constructed frame of the target frame, respectively; and training the frame construction model with the feature maps.

25. The apparatus according to clause 24, wherein the average residual is obtained using the resampling factor and a frame from a video sequence.

26. The apparatus according to clause 24 or 25, wherein the prediction is obtained using the average residual.

27. The apparatus according to any one of clauses 24 to 26, wherein the one or more processors are further configured to execute the instructions to cause the apparatus to perform:

obtaining one or more loss functions of corresponding one or more machine analysis models with label information.

28. The apparatus according to clause 27, wherein the one or more processors are further configured to execute the instructions to cause the apparatus to perform:

determining a total loss function using contour loss, feature map distortion of the one or more feature maps, and the one or more loss functions.

29. The apparatus according to clause 28, wherein the loss function of each of the one or more machine analysis model is determined by a mean squared difference between a machine analysis model feature map of the target frame and a machine analysis model feature map of the constructed frame of the machine analysis model.

30. An apparatus for temporal resampling for multi-task machine vision, the apparatus comprising:

a memory figured to store instructions; and one or more processors configured to execute the instructions to cause the apparatus to perform:

receiving a video sequence;

performing temporal resampling on the video sequence;

extracting feature maps from corresponding one or more machine analysis models for a target frame for training a frame construction model.

31. The apparatus according to clause 30, wherein the one or more processors are further configured to execute the instructions to cause the apparatus to perform:

obtaining an average residual of the target frame based on resampled frames and a resampling factor; and obtaining a prediction of the target frame.

32. An apparatus for temporal resampling for multi-task machine vision, the apparatus comprising:

a memory figured to store instructions; and one or more processors configured to execute the instructions to cause the apparatus to perform:

receiving a bitstream of a video sequence after temporal resampling; and constructing a target frame from the bitstream using a frame construction model.

33. The apparatus according to clause 32, wherein an input of the frame construction model is a channel-wise concatenation of an average residual of the target frame and a prediction of the target frame, the average residual of the target frame is obtained based on resampled frames and a resampling factor.

34. The apparatus according to clause 32 or 33, wherein the frame construction model is trained with feature maps, the feature maps being extracted from corresponding one or more machine analysis models for the target frame and the constructed frame of the target frame, respectively.

35. An apparatus for temporal resampling for multi-task machine vision, the apparatus comprising:

a memory figured to store instructions; and one or more processors configured to execute the instructions to cause the apparatus to perform:

receiving a video sequence;

determining a moving complexity of the video sequence; and determining whether to perform temporal resampling based on the moving complexity.

36. The apparatus according to clause 35, wherein the one or more processors are further configured to execute the instructions to cause the apparatus to perform:

not performing the temporal resampling when the moving complexity is greater than or equal to a first threshold; or performing the temporal resampling when the moving complexity is less than a second threshold.

37. The apparatus according to clause 36, wherein when the moving complexity is less than the first threshold and greater than or equal to the second threshold, the one or more processors are further configured to execute the instructions to cause the apparatus to perform:

determining a quantization parameter associated with the video sequence; and determining whether to perform the temporal resampling based on the quantization parameter.

38. The apparatus according to clause 37, wherein the one or more processors are further configured to execute the instructions to cause the apparatus to perform:
performing the temporal resampling when the quantization parameter is equal to or greater than a preset value.

39. The apparatus according to any one of clauses 35 to 37, wherein the one or more processors are further configured to execute the instructions to cause the apparatus to perform:
calculating an average mean absolute difference (MAD) for a testing point with a range;
sampling all the testing points across the video sequence equally with an interval; and
obtaining the moving complexity of the video sequence based on the average MAD and the interval.

40. An apparatus for temporal resampling for multi-task machine vision, the apparatus comprising:
a memory figured to store instructions; and
one or more processors configured to execute the instructions to cause the apparatus to perform:
receiving a bitstream of a video sequence; and
determining whether to construct a target frame from the bitstream using a frame construction model based a moving complexity.

41. The apparatus according to clause 40, wherein the moving complexity is determined based on an index signaled in the bitstream.

42. The apparatus according to clause 41, wherein the one or more processors are further configured to execute the instructions to cause the apparatus to perform:
skipping constructing the target frame from the bitstream using the frame construction model when the index indicates the moving complexity is greater than or equal to a first threshold; or
constructing the target frame from the bitstream using the frame construction model when the index indicates the moving complexity is less than a second threshold.

43. The apparatus according to clause 42, wherein when the index indicates the moving complexity is less than the first threshold and greater than or equal to the second threshold, the one or more processors are further configured to execute the instructions to cause the apparatus to perform:
determining a quantization parameter associated with the video sequence; and
determining whether to construct the target frame from the bitstream using the frame construction model based on the quantization parameter.

44. The apparatus according to clause 43, wherein the one or more processors are further configured to execute the instructions to cause the apparatus to perform:
constructing the target frame from the bitstream using the frame construction model when the quantization parameter is equal to or greater than a preset value.

45. An apparatus for temporal resampling for multi-task machine vision, the apparatus comprising:
a memory figured to store instructions; and
one or more processors configured to execute the instructions to cause the apparatus to perform:
receiving a bitstream of a video sequence; and
determining whether to construct a target frame from the bitstream using a frame construction model based on a flag signaled in the bitstream.

46. The apparatus according to clause 45, wherein the one or more processors are further configured to execute the instructions to cause the apparatus to perform:
skipping constructing the target frame from the bitstream using the frame construction model when the flag indicates the temporal resampling is not performed on the video sequence; or
constructing the target frame from the bitstream using the frame construction model when the flag indicates the temporal resampling is performed on the video sequence.

47. A non-transitory computer readable medium that stores a set of instructions that is executable by one or more processors of an apparatus to cause the apparatus to initiate a method for training a frame construction model for temporal resampling, the method comprising
obtaining a constructed frame of a target frame using a frame construction model, wherein an input of the frame construction model is a channel-wise concatenation of an average residual of the target frame and a prediction of the target frame, the average residual of the target frame is obtained based on resampled frames and a resampling factor;
extracting feature maps from corresponding one or more machine analysis models for the target frame and the constructed frame of the target frame, respectively; and
training the frame construction model with the feature maps.

48. The non-transitory computer readable medium according to clause 47, wherein the average residual is obtained using the resampling factor and a frame from a video sequence.

49. The non-transitory computer readable medium according to clause 47 or 48, wherein the prediction is obtained using the average residual.

50. The non-transitory computer readable medium according any one of clauses 47 to 49, wherein the method further comprises:
obtaining one or more loss functions of corresponding one or more machine analysis models with label information.

51. The non-transitory computer readable medium according to clause 50, wherein the method further comprises:
determining a total loss function using contour loss, feature map distortion of the one or more feature maps, and the one or more loss functions.

52. The non-transitory computer readable medium according to clause 51, wherein the loss function of each of the one or more machine analysis model is determined by a mean squared difference between a machine analysis model feature map of the target frame and a machine analysis model feature map of the constructed frame of the machine analysis model.

53. A non-transitory computer readable medium storing a bitstream, wherein the bitstream comprises an index associated with encoded video data of a video sequence, the index indicating moving complexity of the video sequence, wherein the index causes a decoder to:
skip constructing a target frame from the bitstream using a frame construction model when the index indicates the moving complexity is greater than or equal to a first threshold; or
construct a target frame from the bitstream using a frame construction model when the index indicates the moving complexity is less than a second threshold.

54. A non-transitory computer readable medium storing a bitstream, wherein the bitstream comprises a flag associated with encoded video data of a video sequence, the flag indicating whether temporal resampling is performed on the video sequence, wherein the flag causes a decoder to:
skip constructing a target frame from the bitstream using a frame construction model when the flag indicates the temporal resampling is not performed on the video sequence; or
construct a target frame from the bitstream using a frame construction model when the flag indicates the temporal resampling is performed on the video sequence.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for temporal resampling for multi-task machine vision, comprising:
receiving a bitstream of a video sequence after temporal resampling; and
constructing a target frame from the bitstream using a frame construction model, wherein an input of the frame construction model is a channel-wise concatenation of an average residual of the target frame and a prediction of the target frame, the average residual of the target frame is obtained based on resampled frames and a resampling factor.

2. The method according to claim 1, wherein the average residual is obtained using the resampling factor and a frame from the video sequence.

3. The method according to claim 1, wherein the prediction is obtained using the average residual.

4. The method according to claim 1, wherein the frame construction model is trained with feature maps, the feature maps being extracted from corresponding one or more machine analysis models for the target frame and the constructed frame of the target frame, respectively.

5. A method for temporal resampling for multi-task machine vision, comprising:
receiving a bitstream of a video sequence after temporal resampling; and
constructing a target frame from the bitstream using a frame construction model; wherein the frame construction model is trained with feature maps, the feature maps being extracted from corresponding one or more machine analysis models for the target frame and the constructed frame of the target frame, respectively, and one or more loss functions of corresponding one or more machine analysis models are obtained with label information.

6. The method according to claim 5, wherein a total loss function is determined using contour loss, feature map distortion of the one or more feature maps, and the one or more loss functions.

7. The method according to claim 6, wherein the loss function of each of the one or more machine analysis model is determined by a mean squared difference between a machine analysis model feature map of the target frame and a machine analysis model feature map of the constructed frame of the machine analysis model.

8. An apparatus for temporal resampling for multi-task machine vision, the apparatus comprising:
a memory figured to store instructions; and
one or more processors configured to execute the instructions to cause the apparatus to perform:

receiving a bitstream of a video sequence after temporal resampling; and constructing a target frame from the bitstream using a frame construction model wherein an input of the frame construction model is a channel-wise concatenation of an average residual of the target frame and a prediction of the target frame, the average residual of the target frame is obtained based on resampled frames and a resampling factor.

9. The apparatus according to claim 8, wherein the average residual is obtained using the resampling factor and a frame from the video sequence.

10. The apparatus according to claim 8, wherein the prediction is obtained using the average residual.

11. The apparatus according to claim 8, wherein the frame construction model is trained with feature maps, the feature maps being extracted from corresponding one or more machine analysis models for the target frame and the constructed frame of the target frame, respectively.

12. An apparatus for temporal resampling for multi-task machine vision, the apparatus comprising:
    a memory configured to store instructions; and
    one or more processors configured to execute the instructions to cause the apparatus to perform:
        receiving a bitstream of a video sequence after temporal resampling; and
        constructing a target frame from the bitstream using a frame construction model; wherein the frame construction model is trained with feature maps, the feature maps being extracted from corresponding one or more machine analysis models for the target frame and the constructed frame of the target frame, respectively; and one or more loss functions of corresponding one or more machine analysis models are obtained with label information.

13. The apparatus according to claim 12, wherein a total loss function is determined using contour loss, feature map distortion of the one or more feature maps, and the one or more loss functions.

14. A method for temporal resampling for multi-task machine vision, comprising:
    receiving a video sequence;
    determining a moving complexity of the video sequence, wherein determining the moving complexity further comprises:
        calculating an average mean absolute difference (MAD) for a testing point with a range;
        sampling all the testing points across the video sequence equally with an interval; and
        obtaining the moving complexity of the video sequence based on the average MAD and the interval; and
    determining whether to perform temporal resampling based on the moving complexity.

15. The method according to claim 14, wherein determining whether to perform the temporal resampling based on the moving complexity further comprises:
    not performing the temporal resampling when the moving complexity is greater than or equal to a first threshold; or
    performing the temporal resampling when the moving complexity is less than a second threshold.

16. The method according to claim 15, when the moving complexity is less than the first threshold and greater than or equal to the second threshold, the method further comprises:
    determining a quantization parameter associated with the video sequence; and
    determining whether to perform the temporal resampling based on the quantization parameter.

17. The method according to claim 16, wherein determining whether to perform the temporal resampling based on the quantization parameter further comprises:
    performing the temporal resampling when the quantization parameter is equal to or greater than a preset value.

* * * * *